(12) United States Patent
Durrani et al.

(10) Patent No.: US 11,752,833 B2
(45) Date of Patent: Sep. 12, 2023

(54) SYSTEM FOR AIR-CONDITIONING THE AIR OF A PASSENGER COMPARTMENT AND FOR HEAT TRANSFER WITH DRIVE COMPONENTS OF A MOTOR VEHICLE AND METHOD FOR OPERATING THE SYSTEM

(71) Applicant: Hanon Systems, Daejeon (KR)

(72) Inventors: Navid Durrani, Kerpen (DE); Martin Hötzel, Ratingen (DE); Tobias Haas, Cologne (DE)

(73) Assignee: HANON SYSTEMS, Daejeon (KR)

( * ) Notice: Subject to any disclaimer, the term of this patent is extended or adjusted under 35 U.S.C. 154(b) by 139 days.

(21) Appl. No.: 17/202,923

(22) Filed: Mar. 16, 2021

(65) Prior Publication Data

US 2021/0291622 A1    Sep. 23, 2021

(30) Foreign Application Priority Data

Mar. 19, 2020   (DE) .......................... 102020107631.2
Jan. 20, 2021   (DE) .......................... 102021101127.2

(51) Int. Cl.
*B60H 1/00* (2006.01)

(52) U.S. Cl.
CPC ..... *B60H 1/00921* (2013.01); *B60H 1/00278* (2013.01); *B60H 2001/00307* (2013.01);
(Continued)

(58) Field of Classification Search
CPC ........... B60H 1/00921; B60H 1/00278; B60H 2001/00307; B60H 2001/00928; B60H 1/00949
(Continued)

(56) References Cited

U.S. PATENT DOCUMENTS

2016/0265819 A1* 9/2016 Durrani ...................... F25B 5/02
2017/0182867 A1* 6/2017 Durrani ................... B60H 1/323
2018/0272830 A1* 9/2018 Vespa ................ B60H 1/00921

FOREIGN PATENT DOCUMENTS

DE       102013105747 A1   1/2014
DE       102019109796 A1   12/2019
(Continued)

*Primary Examiner* — Davis D Hwu

(74) *Attorney, Agent, or Firm* — Shumaker, Loop & Kendrick, LLP; James D. Miller

(57) ABSTRACT

A system for air-conditioning air of a passenger compartment and for heat transfer with drive components of a motor vehicle. The system has a refrigerant circuit and a coolant circuit. The refrigerant circuit is formed with a compressor, a first refrigerant-coolant heat exchanger operated as a condenser/gas cooler, a refrigerant-air heat exchanger operated as an evaporator for conditioning supply air of the passenger compartment with an upstream expansion element, and a second refrigerant-coolant heat exchanger operated as an evaporator for heat transfer between a coolant for tempering the drive components of the motor vehicle and the refrigerant with an upstream expansion element, and with a bypass flow path around the heat exchangers operated as the evaporators on the low-pressure side. In addition to the first refrigerant-coolant heat exchanger, the coolant circuit has a coolant-air heat exchanger operated as a thermal heat exchanger for heating supply air of the passenger compartment.

24 Claims, 11 Drawing Sheets

(52) U.S. Cl.
CPC .............. *B60H 2001/00928* (2013.01); *B60H 2001/00949* (2013.01)

(58) Field of Classification Search
USPC ........................................................ 165/202
See application file for complete search history.

(56) References Cited

FOREIGN PATENT DOCUMENTS

| | | | |
|---|---|---|---|
| JP | 2011088584 | A | 5/2011 |
| JP | 2019199113 | A | 11/2019 |
| JP | 2019209938 | A | 12/2019 |
| JP | 2019211014 | A | 12/2019 |
| KR | 20170011967 | A | 2/2017 |
| KR | 20180003986 | A | 1/2018 |
| KR | 20180122272 | A | 11/2018 |
| KR | 20200008516 | A | 1/2020 |

\* cited by examiner

SYSTEM FOR AIR-CONDITIONING THE AIR OF A PASSENGER COMPARTMENT AND FOR HEAT TRANSFER WITH DRIVE COMPONENTS OF A MOTOR VEHICLE AND METHOD FOR OPERATING THE SYSTEM

CROSS-REFERENCE TO RELATED APPLICATIONS

This patent application claims priority to German Patent Application No. DE 10 2021 101 127.2 filed on Jan. 20, 2021 and German Patent Application No. DE 10 2020 107 631.2 filed on Mar. 19, 2020, the entire disclosures of which are hereby incorporated herein by reference.

TECHNICAL FIELD

The invention relates to a system for air-conditioning the air of a passenger compartment and for heat transfer with drive components of a motor vehicle. The system has a refrigerant circuit with a first refrigerant-coolant heat exchanger operated as a condenser/gas cooler, at least one refrigerant-air heat exchanger operated as an evaporator for conditioning supply air of the passenger compartment, and a second refrigerant-coolant heat exchanger operated as an evaporator for heat transfer between a coolant for tempering drive components of the motor vehicle and the refrigerant, as well as a coolant circuit with the first refrigerant-coolant heat exchanger and a coolant-air heat exchanger operated as a thermal heat exchanger. In addition, the invention relates to a method for operating the system.

BACKGROUND ART

Motor vehicles with different drive concepts are known from the prior art. The concepts are based on drives using an internal combustion engine, an electric engine or a combination of both types of engine. Motor vehicles with a combination of internal combustion engine and electric engine drive consequently have a hybrid drive, so that the motor vehicle can be driven electrically, electrically/with internal combustion engine or also with internal combustion engine, as needed. In this case, vehicles with a hybrid drive, the battery of which can be charged via the internal combustion engine as well as from the power grid, are called plug-in hybrids or PHEVs for "plug-in hybrid electric vehicle", and formed mostly with a more powerful battery than motor vehicles with a battery that can only be charged via the internal combustion engine.

Conventional motor vehicles with an electric or a hybrid drive, on the one hand, have a higher cooling requirement than motor vehicles with a pure combustion engine drive due to the formation with additional components such as a high-voltage battery, an internal charger, a transformer, an inverter and the electric engine. In addition to the refrigerant circuit of the air-conditioning system, the hybrid-driven vehicles are formed with a coolant circuit in which the coolant circulating to dissipate the heat emitted by the drive components is passed through an air-cooled heat exchanger.

In order to comply with the permitted temperature limits of the high-voltage battery especially, either the coolant circuit is provided with an additional refrigerant-coolant heat exchanger for thermal coupling with the refrigerant circuit of the air-conditioning system or a heat exchanger formed as a battery cooler cooled directly by refrigerant is provided for cooling the battery. The refrigerant-coolant heat exchanger operated as an evaporator of the refrigerant for cooling the battery is also referred to as a chiller.

A system for heat distribution of a PHEV consequently has at least one refrigerant circuit and one coolant circuit, as is well-known.

On the other hand, it is well-known that electric vehicles and vehicles with hybrid drive as well as fuel cell vehicles and highly efficiently combustion engine-driven vehicles do not generate enough waste heat to heat the passenger compartment at low ambient temperatures according to the requirements of thermal comfort.

A first, cost-effective and installation space-saving solution is an electric heater, which is formed, for example, as a PTC heater for heating the supply air flowing into the passenger compartment. Systems provided with a PTC heater, however, have a high energy consumption at low blow-out temperatures of the supply air for heating the passenger compartment. The electric auxiliary heater, which cannot be operated in an energy-efficient manner, also shortens the range of battery-operated motor vehicles.

A second, more energy-saving solution is an air-conditioning system with a heat pump function, which uses various heat sources and heat sinks, but requires a much larger installation space than the first solution with an electric heater.

The formation of the air-conditioning systems known from the prior art with heat pump function for heat distribution within battery-operated motor vehicles is highly complex and requires a large number of components on both the refrigerant side and on the coolant side as well as on the air side, which causes high system costs.

In this case, for example, at least three heat exchangers are arranged within the air conditioner of conventional air-conditioning systems of a motor vehicle with a refrigerant-air heat exchanger operated as an evaporator for cooling and/or dehumidifying the supply air for the passenger compartment and a refrigerant-air heat exchanger operated as a condenser/gas cooler as well as a coolant-air heat exchanger for heating the supply air for the passenger compartment.

DE 10 2013 105 747 A1 discloses a device for heat distribution in a hybrid vehicle with an engine cooling circuit and a refrigerant circuit with an evaporator, a compressor, a heat exchanger for supplying heat from the refrigerant to air to be conditioned for the passenger compartment as well as a heat exchanger for heat transfer between the refrigerant of the refrigerant circuit and the coolant of the engine cooling circuit. In this case, the heat exchanger is operable for heat transfer between the refrigerant and the coolant as an evaporator for heat transfer from the coolant to the evaporating refrigerant and as a condenser for heat transfer from the condensing refrigerant to the coolant.

DE 10 2019 109 796 A1 shows a heat flow management device for motor vehicles with a refrigerant circuit, a drive train coolant circuit and a heating train heat carrier circuit. The refrigerant circuit has a compressor, an indirect condenser, an expansion element, an ambient heat exchanger and an evaporator and a chiller, each with an associated expansion element. The drive train coolant circuit is formed with a coolant pump, the chiller, an electric engine heat exchanger and a drive train coolant radiator, while the heating train heat carrier circuit is formed with a coolant pump, the indirect condenser and a thermal heat exchanger. The refrigerant circuit is thermally coupled to the drive train coolant circuit via the chiller on the one hand and to the heating train heat carrier circuit via the indirect condenser on the other hand, while the drive train coolant circuit and the heating train heat carrier circuit are only indirectly thermally coupled to one another via the refrigerant circuit.

DISCLOSURE OF INVENTION

It is an object of the invention to provide a modular system for air-conditioning the air of the passenger compartment and for heat transfer with drive components of the motor vehicle, especially for motor vehicles with a purely electric drive or a combined electric and internal combustion engine drive. In addition to a comfortable heating of the supply air for the passenger compartment, the system should also enable conditioning of the components of the drive train, especially tempering of the high-voltage battery of the electric drive. In this case, the system should be operable with maximum efficiency both in refrigeration mode and in heating mode. The manufacturing, maintenance and operating costs and the required installation space of the system should be minimal.

The object is achieved by the subject matter with the features disclosed herein.

The object is achieved by a system according to the invention for air-conditioning the air 10 of a passenger compartment and for heat transfer with drive components of a motor vehicle, also referred to as a heat flow management system due to the connection of various heat sources and heat sinks.

The system has a refrigerant circuit and at least one coolant circuit. The refrigerant circuit is formed with a compressor, a first refrigerant-coolant heat exchanger operated as a condenser/gas cooler, at least one refrigerant-air heat exchanger operated as an evaporator for conditioning the supply air of the passenger compartment with an upstream expansion element and at least one second refrigerant-coolant heat exchanger operated as an evaporator for heat transfer between a coolant for tempering drive components of the motor vehicle and the refrigerant with an upstream expansion element.

The drive component is an electrical component, for example a high-voltage battery or an electric engine, of an electric drive train of the motor vehicle.

If the liquefaction of the refrigerant occurs during subcritical operation, for example with the refrigerant R134a or under certain ambient conditions with carbon dioxide, the heat exchangers are referred to as condensers. Part of the heat transfer takes place at constant temperature. With supercritical operation or with supercritical heat emission in the heat exchanger, the temperature of the refrigerant steadily decreases. In this case, the heat exchanger is also referred to as a gas cooler. Supercritical operation can occur under certain ambient conditions or operating modes of the refrigerant circuit with the refrigerant carbon dioxide, for example.

The at least one coolant circuit is formed with the first refrigerant-coolant heat exchanger of the refrigerant circuit and a coolant-air heat exchanger operated as a thermal heat exchanger for heating supply air of the passenger compartment.

According to the conception of the invention, the refrigerant circuit has a bypass flow path around the heat exchangers operated as low-pressure side evaporators.

The refrigerant circuit is advantageously formed in such a way that the at least one refrigerant-air heat exchanger for conditioning supply air of the passenger compartment with the upstream expansion element, the second refrigerant-coolant heat exchanger for heat transfer between a coolant for tempering drive components and the refrigerant with the upstream expansion element and the bypass flow path can be loaded with refrigerant in parallel to one another and independently of one another. In this case, the refrigerant circuit has at least two flow paths, each with the heat exchanger operated as an evaporator and the expansion element upstream of the heat exchanger in the direction of flow of the refrigerant, as well as the bypass flow path. The flow paths are arranged in parallel to one another and can be loaded with refrigerant individually or in parallel to one another, as needed.

According to a configuration of the invention, the refrigerant circuit is provided with a further refrigerant-air heat exchanger for heat transfer between the refrigerant and ambient air, which is arranged in the direction of flow of the refrigerant after the first refrigerant-coolant heat exchanger. The first refrigerant-coolant heat exchanger formed as a thermal connection between the refrigerant circuit and the at least one coolant circuit, and the refrigerant-air heat exchanger for heat transfer between the refrigerant and ambient air are arranged in series.

The refrigerant-air heat exchanger for heat transfer between the refrigerant and ambient air is arranged within an air duct for the targeted passing of ambient air. The air duct, which is positioned especially with one end face in a front area of the motor vehicle, is closable by means of a flow guide, especially on the end face. The flow guide is advantageously actively controllable and adjustable in an electrically driven manner. The air duct can be open or closed fully or partially with the flow guide. A fan for sucking in the ambient air through the end face can also be arranged within the air duct.

According to a further development of the invention the refrigerant circuit has a bypass flow path around the first refrigerant-coolant heat exchanger operated as a high-pressure side condenser/gas cooler, which extends from a branch point to an opening point.

According to a first alternative configuration of the invention, the opening point is formed as a three-way valve with expansion function and with three connections. In this case, the three-way valve is connected at a first connection with the bypass flow path around the first refrigerant-coolant heat exchanger operated as a condenser/gas cooler, at a second connection with the first refrigerant-coolant heat exchanger operated as a condenser/gas cooler, and at a third connection with the refrigerant-air heat exchanger for heat transfer between the refrigerant and ambient air.

According to a second alternative configuration of the invention, the refrigerant circuit is formed with a bypass flow path around the refrigerant-air heat exchanger for heat transfer between the refrigerant and ambient air, which extends from a branch point to an opening point. The branch point is arranged between the first refrigerant-coolant heat exchanger and the refrigerant-air heat exchanger for heat transfer between the refrigerant and ambient air as well as formed as a three-way valve with expansion function and with three connections.

In this case, the three-way valve is connected at a first connection with the bypass flow path around the refrigerant-air heat exchanger for heat transfer between the refrigerant and ambient air, at a second connection with the refrigerant-air heat exchanger for heat transfer between the refrigerant and ambient air, and at a third connection with the first refrigerant-coolant heat exchanger operated as a condenser/gas cooler.

According to a further configuration of the invention, the bypass flow path formed around the heat exchangers operated as low-pressure side evaporators and a flow path formed with the second refrigerant-coolant heat exchanger operated as an evaporator each extend from a branch point to an opening point. The branch point is formed as a three-way valve with expansion function and with three connections.

In this case, the three-way valve is advantageously connected at a first connection with the bypass flow path around the heat exchangers operated as evaporators, at a second connection with a flow path with the second refrigerant-coolant heat exchanger operated as an evaporator, and at a third connection with a branch point to a flow path with a refrigerant-air heat exchanger operated as an evaporator for conditioning supply air of the passenger compartment.

Depending on the switching position, the three-way valves can be operated as a shut-off valve and/or expansion valve in different functions. In the case of the three-way valves, a first connection and a second connection are formed as an outlet and a third connection is formed as an inlet for the refrigerant.

The three-way valve is advantageously configured in such a way that in a first operating position all connections are closed, in a second operating position the first connection is closed and the second connection and the third connection are open, or in a third operating position the second connection is closed and the first connection and the third connection, especially, are fully open.

In this case, the three-way valve is formed in each case in such a way that in the second operating position with the first connection closed and the second connection open as well as the third connection open, a passage between the open connections is partially or fully open, so that the refrigerant expands when flowing through the three-way valve or passes through the three-way valve without pressure loss.

According to a further development of the invention, the coolant circuit is formed with the first coolant-air heat exchanger operated as a thermal heat exchanger for heating supply air of the passenger compartment and a second coolant-air heat exchanger for heat transfer from the coolant to ambient air. The coolant circuit has a first flow path and a second flow path, which each extend from a branch point to an opening point and can be loaded with coolant in parallel to one another and independently of one another. In this case, the first coolant-air heat exchanger operated as a thermal heat exchanger are arranged within the first flow path and the second coolant-air heat exchanger for heat transfer from the coolant to ambient air is arranged within the second flow path.

The opening point or the branch point of the coolant circuit is formed as a three-way valve or a heat exchanger.

A particular advantage of the invention is that the second refrigerant-coolant heat exchanger for heat transfer between a coolant for tempering drive components of the motor vehicle and the refrigerant as a component of a further, second coolant circuit. The second coolant circuit has a coolant-air heat exchanger for heat transfer from the coolant to ambient air.

The coolant-air heat exchanger for heat transfer from the coolant of a first coolant circuit to ambient air and/or the coolant-air heat exchanger for heat transfer from the coolant of the second coolant circuit to ambient air are arranged with the refrigerant-air heat exchanger for heat transfer between the refrigerant of the refrigerant circuit and ambient air within the air duct, which can be closed by means of the flow guide, for the targeted passing of ambient air. The coolant-air heat exchanger and the refrigerant-air heat exchanger can advantageously be loaded with ambient air one after the other or in parallel and thus independently of one another.

In the case of an arrangement of the refrigerant-air heat exchanger and the coolant-air heat exchangers for serial loading with ambient air, the refrigerant-air heat exchanger is arranged in the direction of flow of the ambient air between the coolant-air heat exchangers, wherein ambient air first flows to the coolant-air heat exchanger of the first coolant circuit. Alternatively, the refrigerant-air heat exchanger can also be arranged in the direction of flow of the ambient air in such a way that ambient air flows initially or finally to it.

The object is also achieved by a method according to the invention for operating the above system for air-conditioning the air of a passenger compartment and for heat transfer with drive components of a motor vehicle. The method has the following steps:
 transferring heat from supply air for a passenger compartment to a refrigerant circulating in a refrigerant circuit when flowing through at least one refrigerant-air heat exchanger operated as an evaporator, and/or
 transferring heat from a coolant to the refrigerant circulating in the refrigerant circuit when flowing through at least one refrigerant-coolant heat exchanger operated as an evaporator and tempering, especially cooling, at least one drive component, such as an electric drive train, as well as
 transferring heat from the refrigerant circulating in the refrigerant circuit to a coolant circulating in a coolant circuit when flowing through a refrigerant-coolant heat exchanger, wherein the refrigerant is de-heated and at least partially liquefied and the coolant of the coolant circuit is heated.

According to a further development of the invention, when operating the system in a reheating mode or a heating mode, the flow guide of the air duct is closed for the targeted passing of ambient air, wherein the refrigerant-air heat exchanger is arranged for heat transfer between the refrigerant of the refrigerant circuit and ambient air and/or the coolant-air heat exchanger is arranged for heat transfer from the coolant of the first coolant circuit to ambient air and/or the coolant-air heat exchanger is arranged for heat transfer from the coolant of the second coolant circuit to ambient air so that the air duct is not loaded with ambient air and no heat is transferred between the refrigerant of the refrigerant circuit and ambient air and/or no heat is transferred from a coolant to ambient air.

The flow guide is advantageously controlled actively, especially electrically driven, depending on the operating mode of the system and as needed.

According to a configuration of the invention, when operating the system in a heating mode with ambient air as heat source, a three-way valve formed as a branch point is operated in a bypass mode in such a way that the refrigerant passes through the bypass flow path around the heat exchangers operated as evaporators when operating in other operating modes, and none of the heat exchangers is loaded with refrigerant. In this case, the three-way valve is fully open between a third connection, which is connected with a branch point to a flow path with at least one of the refrigerant-air heat exchangers operated as an evaporator when operating in other operating modes, and a first connection, which is connected with the bypass flow path, and a second connection, which is connected with a flow path with the refrigerant-coolant heat exchanger operated as an evaporator when operating in other operating modes, is closed.

A three-way valve formed as an opening point or a branch point can be operated to use the ambient air as heat source for the refrigerant in such a way that the refrigerant is expanded from a high-pressure level to a low-pressure level when flowing through the three-way valve. The three-way valve is open between a third connection and a first connection for the expanding passage of the refrigerant to the refrigerant-air heat exchanger for heat transfer between the refrigerant and ambient air, especially from the ambient air to the refrigerant, and a first connection is closed.

The advantageous configuration of the invention enables the system to be used in motor vehicles with an electric engine drive or a hybrid drive consisting of an electric engine and an internal combustion engine.

The system according to the invention with integrated heat pump functionality, especially for purely electrically driven or hybrid-driven vehicles with internal combustion engines, has collectively various advantages:
- satisfying all of the requirements for thermal management of an electric vehicle in a very wide range of ambient temperature with air-conditioning the air of a passenger compartment by cooling, dehumidifying and heating as well as tempering, especially cooling the battery and components of the drive train,
- high degree of waste heat recovery, with energy-efficient heating of the supply air for the passenger compartment by using waste heat of the refrigerant circuit and recovering heat from components of the electric drive train, with
- maximum efficiency when operating, especially in reheating mode, with a high degree of waste heat utilization,
- modular structure and minimal installation space thanks to compact design with low complexity, both on the refrigerant side and on the air side,
- low manufacturing, maintenance as well as operating costs.

The system, especially the refrigerant circuit, is designed independently of the refrigerant used and thus also for R134a, R744, R1234yf or other refrigerants.

BRIEF DESCRIPTION OF THE DRAWINGS

Further details, features and advantages of configurations of the invention are evident from the following description of exemplary embodiments with reference to the associated drawings.

MODE FOR THE INVENTION

Figure 1:
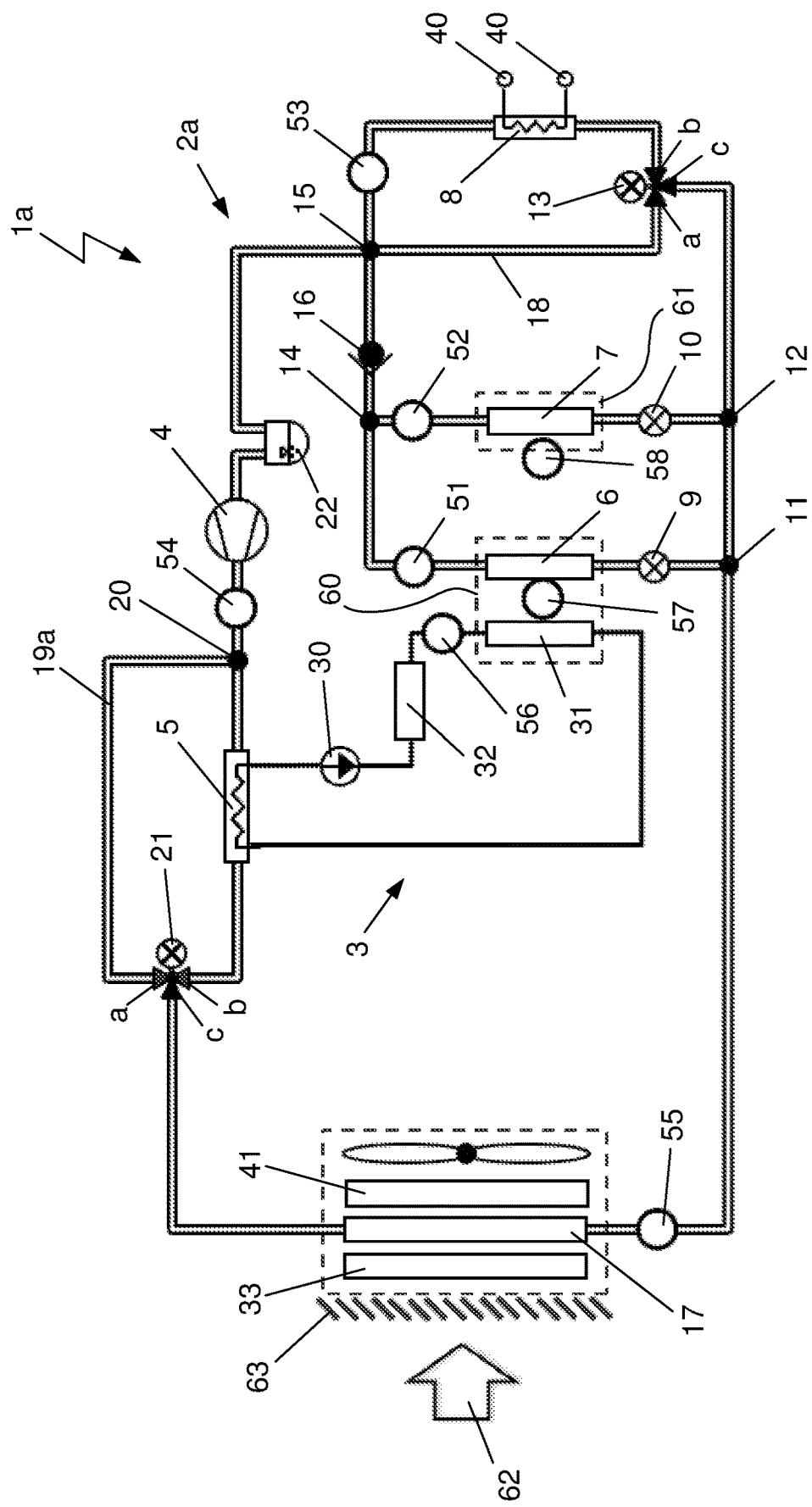
FIG. 1: shows a first system for air-conditioning the air of a passenger compartment and for heat transfer with drive components of a motor vehicle with a refrigerant circuit with a low-pressure side bypass flow path and two coolant circuits each thermally coupled to the refrigerant circuit as well as an actively controllable flow guide for passing ambient air to ambient air heat exchangers.

FIG. 1 shows a first system 1a for air-conditioning the air of a passenger compartment and heat transfer with drive components of a motor vehicle with a refrigerant circuit 2a with heat exchangers 6, 7, 8 operated as evaporators for conditioning the supply air of the passenger compartment as well as drive components of the drive train, especially electric drive train, of the motor vehicle, such as a battery or an electric engine, as well as a first coolant circuit 3 also for conditioning the supply air of the passenger compartment. The first coolant circuit 3 is thermally coupled to the refrigerant circuit 2a via a refrigerant-coolant heat exchanger 5 for the transfer of heat, especially from the refrigerant to the coolant. A second coolant circuit, which is formed for heat transfer between the coolant circulating in the second coolant circuit and the drive components of the drive train, especially electric drive train, of the motor vehicle and thus for tempering the drive components, as needed, is only indicated by two heat exchangers 8, 41. Both coolant circuits 3 are each directly thermally coupled to the refrigerant circuit 2a.

The coolant circuits 3 of the system 1a, which are fluidically separated from one another, are each loaded independently of one another with different coolants. The coolants are each assigned to one of the coolant circuits 3, so that none of the coolants circulates within one of the coolant circuits 3 also depending on the operating mode. The coolant circuits 3 are completely separated from one another in terms of flow.

The refrigerant circuit 2a has a compressor 4 for sucking in and compressing the refrigerant. The compressed and superheated gaseous refrigerant can be passed to a first refrigerant-coolant heat exchanger 5 operated as a coolant-cooled condenser/gas cooler. When flowing through the first refrigerant-coolant heat exchanger 5, heat is transferred from the refrigerant to the coolant circulating in the first coolant circuit 3. In this case, depending on the need and operating mode of the system 1a, the refrigerant is de-heated and liquefied and, if necessary, subcooled. The refrigerant circuit 2a is thermally connected with the high-pressure side first coolant circuit 3 via the first refrigerant-coolant heat exchanger 5. Following the first refrigerant-coolant heat exchanger 5 in the direction of flow of the refrigerant, the refrigerant can be divided at a first branch point 11, a second branch point 12 in the direction of flow of the refrigerant downstream of the first branch point 11 as well as a third branch point 13 in the direction of flow of the refrigerant downstream of the second branch point 12 into one to three of four flow paths, as needed. Three of the four flow paths each have an expansion element 9, 10, 13 and a heat exchanger 6, 7, 8 operated as evaporator. A fourth flow path is formed as a first bypass flow path 18 around the heat exchangers 6, 7, 8 operated as evaporators.

The partial mass flows of the refrigerant passed through the flow paths are brought together again at a first opening point 14 or at a second opening point 15 and sucked in by the compressor 4 as a common refrigerant mass flow. The refrigerant circuit 2a is closed.

The flow paths each formed with a heat exchanger 6, 7, 8 operated as an evaporator or the first bypass flow path 18 are loaded individually or together and in parallel with refrigerant as needed. The proportions of the partial mass flows can be between 0 and 100%, as needed.

At the first branch point 11, the mass flow of the refrigerant can be divided into a first partial mass flow passing through a first flow path and a second partial mass flow passing through a second flow path. A first refrigerant-air heat exchanger 6 operated as an evaporator with a first expansion element 9 upstream in the direction of flow of the refrigerant is arranged within the first flow path, while a second refrigerant-air heat exchanger 7 operated as an evaporator with a second expansion element 10 upstream in the direction of flow of the refrigerant is arranged within the second flow path. The first partial mass flow and the second partial mass flow of the refrigerant are mixed with one another at the first opening point 14.

The refrigerant evaporating when flowing through the respective refrigerant-air heat exchanger 6, 7 absorbs heat from an air mass flow to be supplied to the passenger compartment. The air mass flow is dehumidified and/or cooled in the process. The first refrigerant-air heat exchanger 6 is arranged within a first housing 60 of an air conditioner for conditioning the supply air mass flow supplied to a front area of the passenger compartment, while the second refrigerant-air heat exchanger 7 is arranged within a second housing 61 of the air conditioner for conditioning the supply air mass flow supplied into a rear area of the passenger compartment.

At the second branch point 12, the mass flow of the refrigerant can be divided into the second partial mass flow passed through the second flow path and a third partial mass flow passed through a third flow path. A second refrigerant-coolant heat exchanger 8 also operated as an evaporator with a third expansion element 13 upstream in the direction of flow of the refrigerant is arranged within the third flow path. The third partial mass flow of the refrigerant is admixed with the remaining mass flow at the second opening point 15.

The refrigerant evaporating when flowing through the second refrigerant-coolant heat exchanger 8 absorbs heat from the coolant circulating in the second coolant circuit (not shown). The coolant is thereby cooled down. The second refrigerant-coolant heat exchanger 8, which is also referred to as a chiller, is connected via connections 40 with the second coolant circuit for conditioning drive components of the drive train, especially electric drive train, of the motor vehicle, for example, for tempering the battery, such as a high-voltage battery, an electric drive engine, an internal charger, a transformer or an inverter.

The second coolant circuit (not shown), connected to the low-pressure side of the refrigerant circuit 2a at the connections 40 to the system 1a serves, especially at high values of ambient temperatures, to cool the battery and keep the temperature of the battery below a predetermined limit value. The second coolant circuit, also referred to as a water chiller, can also be utilized to recover waste heat from components of the drive train, especially electric drive train. In the process, the heat is transferred as heat of evaporation to the refrigerant circulating in the refrigerant circuit 2a. In this way, the efficiency of the system 1a is maximized in addition to the possible heat output.

Especially when operating in heating mode, the formation of the system 1a with the second coolant circuit makes it possible to collect the waste heat generated by the drive components, especially electric drive components, and to provide it to the refrigerant in the second refrigerant-coolant heat exchanger 8 as heat of evaporation. Such waste heat recovery contributes to improving the overall energy efficiency and heat efficiency of the motor vehicle. The heat otherwise to be accounted for as heat loss is absorbed by system 1a as heat of evaporation, which increases the performance and efficiency of system 1a when operating in the heating mode.

At the third branch point 13, the refrigerant can be passed either through the third flow path or through the bypass flow path 18. The bypass flow path 18 has no other components besides a refrigerant connection line and serves to pass the refrigerant past the heat exchangers 6, 7, 8 operated as evaporators. The mass flow of the refrigerant flowing through the third flow path is admixed with the remaining mass flow at the second opening point 15.

In order to prevent the mass flow of the refrigerant passed through the third flow path or the bypass flow path 18 from flowing back into the first or second flow path, a non-return device 16, especially a check valve, is provided between the first opening point 14 and 20 the second opening point 15.

The refrigerant circuit 2a has a third refrigerant-air heat exchanger 17 for transferring heat between the refrigerant and ambient air between the first refrigerant-coolant heat exchanger 5, which is formed as a thermal coupling between the refrigerant circuit 2a and the first coolant circuit 3, and the first branch point 12. The system 1a is thus formed on the refrigerant side in such a way that, depending on the need and the operating mode, heat can be dissipated from the refrigerant in the first refrigerant-coolant heat exchanger 5 and/or in the third refrigerant-air heat exchanger 17.

After flowing out of the first refrigerant-coolant heat exchanger 5 operated as a condenser/gas cooler, the refrigerant can be passed to the refrigerant-air heat exchanger 17 operated especially as subcooler/gas cooler. When flowing through the refrigerant-air heat exchanger 17 as an ambient air heat exchanger and releasing heat from the refrigerant to the ambient air, the refrigerant is subcooled or de-heated, liquefied as well as optionally subcooled, depending on the state, need and operating mode, for example when no or only very little heat is transferred in the first refrigerant-coolant heat exchanger 5.

In addition to the already described first bypass flow path 18 arranged on the low-pressure side, the refrigerant circuit 2a has a second bypass flow path 19a arranged on the high-pressure side, which extends from a fourth branch point 20 to a third opening point 21. In this case, the fourth branch point 20 is formed between the compressor 4 and the first refrigerant-coolant heat exchanger 5, while the third opening point 21 is provided between the first refrigerant-coolant heat exchanger 5 and the third refrigerant-air heat exchanger 17.

At the fourth branch point 20, the refrigerant can be passed either through the first refrigerant-coolant heat exchanger 5 or through the second bypass flow path 19a. The second bypass flow path 19a has no other components besides a refrigerant connection line and serves to pass refrigerant past the first refrigerant-coolant heat exchanger 5.

Both the third branch point 13 and the third opening point 21 are formed as a three-way valve with expansion function. Both three-way valves 13, 21 have three connections a, b, c. The connections a, b are each configured as outlets and connection c is configured as an inlet. In this case, the first three-way valve 13 is connected to the first bypass flow path 18 via the first connection a. The first three-way valve 13 is also coupled to the second refrigerant-coolant heat exchanger 8 operated as an evaporator or as a chiller via the second connection b, while a connection to the second branch point 12 is established via third connection c. The second three-way valve 21 is coupled to the second bypass flow path 19a via the first connection a and to the first refrigerant-coolant heat exchanger 5 operated as a condenser/gas cooler via the second connection b, while a connection to the third refrigerant-air heat exchanger 17 is established via the third connection c.

Both three-way valves 13, 21 can be operated in different functional principles, especially as shut-off valves and expansion valves. In the three-way valves 13, 21, the functions of a shut-off valve and an expansion valve are combined within one component.

In a first function, all three connections a, b, c are closed, which is particularly important for the operation of the first three-way valve 13, so that, depending on the operating mode of the system 1a, neither the second refrigerant-coolant heat exchanger 8 nor the first bypass flow path 18 is loaded with refrigerant.

In a second functional principle, the first connection a is closed in each case, while the second connection b and the third connection c are open. In this case, on the one hand, the three-way valve 13, 21 can be set in such a way that the refrigerant is expanded as it flows through, or the three-way valve 13, 21 is fully open so that the refrigerant is passed through almost without pressure loss. When the first three-way valve 13 is operated in this way, the refrigerant flows in through the third connection c and flows out, expanded or without pressure loss, through the second connection b in the direction of the second refrigerant-coolant heat exchanger 8.

When the second three-way valve 21 is operated in this way, the refrigerant flows in through the second connection b and flows out, expanded or without pressure loss, through the third connection c in the direction of the third refrigerant-air heat exchanger 17. With the second three-way valve 21, especially formed as an electronic component, any pressure between the high-pressure level and the low-pressure level of the refrigerant circuit 2a can be set. When the so-called medium-pressure level is set, the third refrigerant-air heat exchanger 17 can be operated as ambient air heat exchanger either as condenser/gas cooler to release heat to the ambient air or as an evaporator to absorb heat from the ambient air.

A third functional principle enables the refrigerant to be passed through a bypass flow path 18, 19a without any pressure loss in the refrigerant. In this case, the second connection b is closed in each case, while both the first connection a and the third connection c are fully open. The three-way valve 13, 21 is operated in a so-called bypass mode.

The expansion elements 9, 10, which are configured as expansion valves, are formed in such a way to close fully as needed so that the operating modes, especially between a heating mode and a refrigeration system mode, can be changed continuously as well as without switching off the compressor 4. A formation of the refrigerant circuit 2a with a reversal of the direction of flow of the refrigerant through the third refrigerant-air heat exchanger 17 can be dispensed with, which, inter alia, leads to a simplified oil management, since oil traps and refrigerant traps in the refrigerant circuit 2a are avoided.

The refrigerant circuit 2a is formed with an accumulator 22 in the low-pressure region between the second opening point 15 and the compressor 4. The accumulator 22 is consequently arranged before the compressor 4 in the direction of flow of the refrigerant.

The first coolant circuit 3 has, in addition to the already described first refrigerant-coolant heat exchanger 5 operated as a condenser/gas cooler in the refrigerant circuit 2a, a first conveying device 30 formed as a coolant pump for circulating the coolant, a first coolant-air heat exchanger 31 for heat transfer from the coolant to the supply air for the passenger compartment as well as an auxiliary thermal heat exchanger 32. The auxiliary thermal heat exchanger 32 can be formed as an electrical heater, for example as a PTC heater, for additional heating of the coolant from which the absorbed heat is transferred to the supply air for the passenger compartment. The optionally operable auxiliary thermal heat exchanger 32 ensures, especially as a high-voltage PTC heater, on the air side for a higher and adapted heating performance and dynamics.

In addition, the first coolant circuit 3 can be formed with a second coolant-air heat exchanger 33 for heat transfer between the coolant and ambient air, especially from the coolant to the ambient air, and thus as an ambient air heat exchanger. The connection, not shown in FIG. 1, of the second coolant-air heat exchanger 33 within the first coolant circuit 3 can be configured as follows: At a branch point provided in the direction of flow of the coolant downstream of the first conveying device 30, the mass flow of the coolant can be divided into a first partial mass flow passed through a first flow path and a second partial mass flow passed through a second flow path. The first coolant-air heat exchanger 31 is arranged within the first flow path, while the second coolant-air heat exchanger 33 is arranged within the second flow path. The first partial mass flow and the second partial mass flow of the coolant are admixed at an opening point specially formed as a three-way valve and then sucked in through the first refrigerant-coolant heat exchanger 5. In this way, the coolant-air heat exchangers 31, 33 can be operated independently of one another or can be loaded with refrigerant in parallel to one another.

The second coolant-air heat exchanger 31 is provided within the first housing 60 of the air conditioner, especially for conditioning the supply air mass flow supplied to the front area of the passenger compartment. In this case, the first refrigerant-air heat exchanger 6 of the refrigerant circuit 2a, operated as an evaporator, is arranged in the direction of flow of the supply air before the coolant-air heat exchanger 31 operated as a thermal heat exchanger, so that, for example, the supply air for the passenger compartment can be heated within the system 1a operated in a heating mode or the supply air for the passenger compartment, which is dehumidified and/or cooled when flowing through the refrigerant-air heat exchanger 6, can be heated again within the system 1a operated in a reheating mode.

The second coolant circuit, which is not completely shown, has, in addition to the already described second refrigerant-coolant heat exchanger 8 also at least one conveying device formed as a coolant pump for circulating the coolant as a thermal coupling to the coolant circuit 2a, at least one coolant heat exchanger for tempering, specifically for cooling the components of the drive train, and a third coolant-air heat exchanger 33 for heat transfer between the coolant and ambient air, especially from the coolant to the ambient air. In this case, the second coolant circuit can be formed from several subordinate coolant circuits, which can be connected with one another or separated by means of 3/2-way valves, for example, and are operated for active cooling in connection with the refrigerant circuit 2a or for passive cooling in connection with the coolant-air heat exchanger 33.

The second coolant-air heat exchanger 33 of the first coolant circuit 3, the third coolant-air heat exchanger 17 of the coolant circuit 2a, and the third coolant-air heat exchanger 41 of the second coolant circuit, which are formed for heat transfer with the ambient air, are arranged in the specified order in the direction of flow 62 of the ambient air in the front area of a body of the motor vehicle. Ambient air flows to the second coolant-air heat exchanger 33 of the first coolant circuit 3 as the first heat exchanger. Alternatively, the heat exchangers 17, 33, 41 can be loaded with ambient air in parallel to one another.

The second coolant-air heat exchanger 33 of the first coolant circuit 3, the third refrigerant-air heat exchanger 17 of the refrigerant circuit 2a, and the third coolant-air heat exchanger 41 of the second coolant circuit, which can be loaded with ambient air and thus operated as ambient air heat exchangers, are arranged within an air duct which can be closed by means of a flow guide 63, also referred to as a cooling air louver. The cooling air louver 63 provided at the motor vehicle on the front side is advantageously electrically adjustable and can be, especially fully or partially, open or closed, as needed. A fan is also provided within the air duct, which during operation sucks in the ambient air through the open cooling air louver 63 and conveys it via the heat transfer surfaces of the heat exchangers 33, 17, 41. The fan is operated especially when the motor vehicle is at a standstill or at a very low speed.

The refrigerant circuit 2a has sensors 51, 52, 53, 54, 55 for regulating the system 1a as needed. In this case, a first sensor 51 and a second sensor 52 are formed as temperature sensors. The first temperature sensor 51 is arranged within the first flow path in the direction of flow of the refrigerant after the first refrigerant-air heat exchanger 6 operated as an evaporator, while the second temperature sensor 52 is arranged within the second flow path in the direction of flow of the refrigerant after the second refrigerant-air heat exchanger 7 operated as an evaporator. In addition, a third sensor 53, a fourth sensor 54 and a fifth sensor 55 are each formed as a pressure-temperature sensor. In this case, the first pressure-temperature sensor 53 is arranged within the third flow path in the direction of flow of the refrigerant after the second refrigerant-coolant heat exchanger 8 operated as an evaporator, while the second pressure-temperature sensor 54 is arranged in the direction of flow of the refrigerant after the compressor and the third pressure-temperature sensor 55 is arranged in the direction of flow of the refrigerant after of the third refrigerant-air heat exchanger 17. In addition, further sensors 56, 57, 58 are provided. In this case, a sixth sensor 56, a seventh sensor 57 and an eighth sensor 58 are each formed as a temperature sensor. The third temperature sensor 56 is arranged within the first coolant circuit 3 in the direction of flow of the coolant before the first coolant-air heat exchanger 31 formed as a thermal heat exchanger, while the fourth temperature sensor 57 is arranged within the first housing 60 of the air conditioner in the direction of flow of the supply air after the first coolant-air heat exchanger 6 operated as an evaporator and before the first coolant-air heat exchanger 31 designed as a thermal heat exchanger, as well as the fifth temperature sensor 58 is arranged within the second housing 61 of the air conditioner in the direction of flow of the supply air after the second refrigerant-air heat exchanger 7 operated as an evaporator.

Figure 2A:
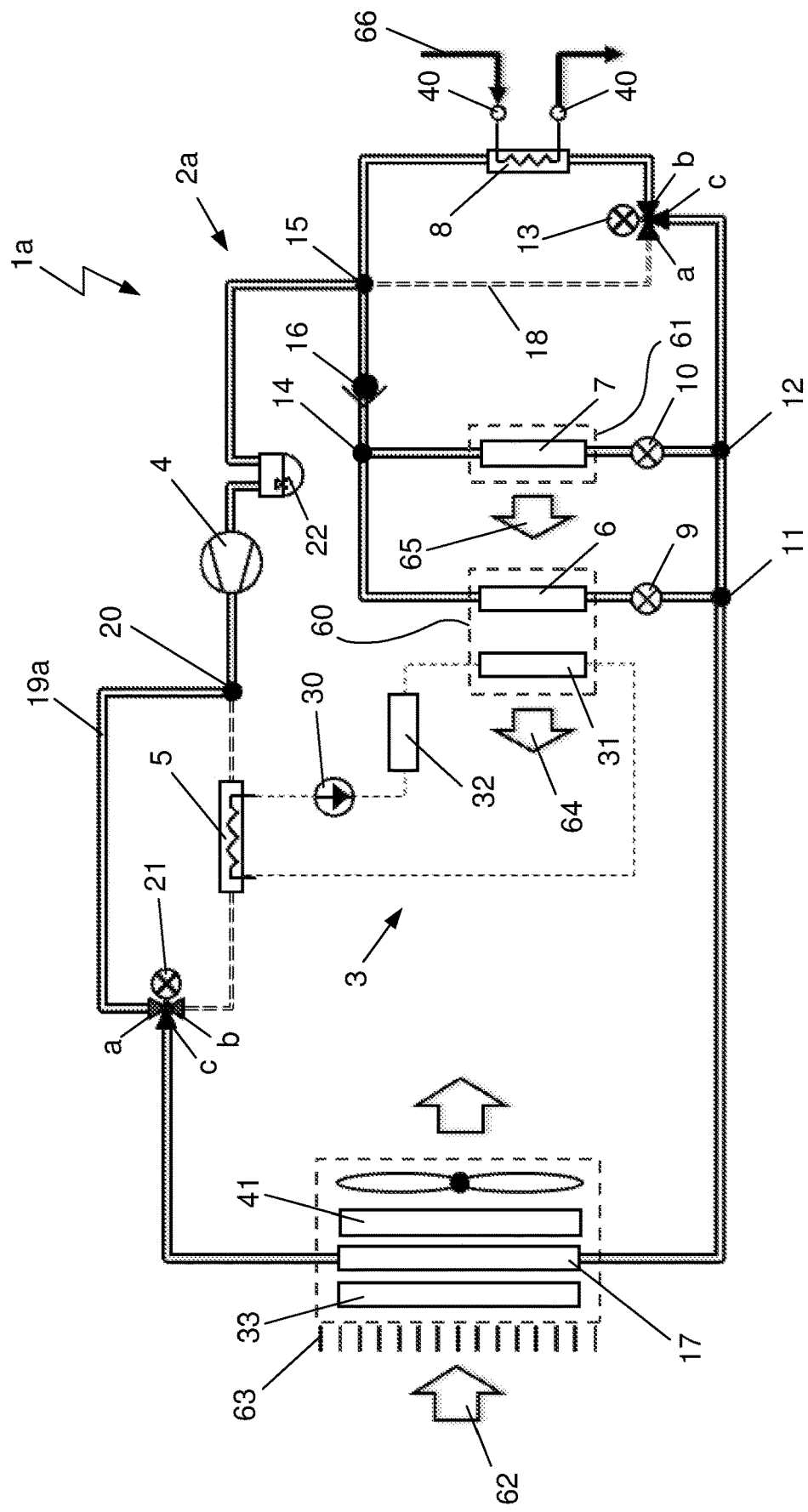
FIG. 2A: shows the system according to FIG. 1 when operating in the refrigeration system mode with active cooling of the drive components of the drive train, especially electric drive train.

When operating the system 1a according to FIG. 1 in a refrigeration system mode with active cooling of drive components of the drive train, especially electric drive train, according to FIG. 2A, the heat transferred in the first refrigerant-air heat exchanger 6 or in the second refrigerant-air heat exchanger 7 from the supply air for the passenger compartment to the refrigerant circulating in the refrigerant circuit 2a, or the heat transferred in the second refrigerant-coolant heat exchanger 8 from at least one component of the drive train, especially electric drive train, to the refrigerant circulating in the refrigerant circuit 2a, is transferred from the refrigerant to the ambient air in the third refrigerant-air heat exchanger 17.

The supply air for the front area of the passenger compartment is passed in the direction of flow 64 through the first housing 60 of the air conditioner, in which the first refrigerant-air heat exchanger 6 is arranged, while the supply air for the rear area of the passenger compartment is passed in the direction of flow 65 through the second housing 61 of the air conditioner, in which the second refrigerant-air heat exchanger 7 is arranged.

The coolant of the second coolant circuit is conveyed in the direction of flow 66 through the second coolant-coolant heat exchanger 8, which is operated as a countercurrent heat exchanger.

After flowing out of the third refrigerant-air heat exchanger 17, the high-pressure refrigerant is divided into three partial mass flows at the branch points 11, 12. The refrigerant of each of the three partial mass flows is expanded and supplied to one of the refrigerant-air heat exchangers 6, 7 operated as evaporators or the second refrigerant-coolant heat exchanger 8 operated as an evaporator. In this case, the first three-way valve 13 formed as the third branch point 13 is operated as an expansion element in the expansion mode. The low-pressure side first bypass flow path 18 is closed and is not loaded with refrigerant.

In addition, the second three-way valve 21 formed as the third opening point 21 is operated in bypass mode. The second three-way valve 21 is fully open between the first connection a and the third connection c, so that the refrigerant passes the second three-way valve 21 with almost no pressure loss. The high-pressure side second bypass flow path 19a is open. The first refrigerant-coolant heat exchanger 5 of the first coolant circuit 3 is not loaded with refrigerant.

The cooling air louver 63 arranged at the motor vehicle on the front side is closed or open depending on the required performance of the third refrigerant-air heat exchanger 17, the third coolant-air heat exchanger 41 or, optionally, the second coolant-air heat exchanger 33 and the speed of the motor vehicle when the fan is not activated, and always open when the fan is activated, so that the ambient air flows through the cooling air louver 63 and over the heat transfer surface of the third refrigerant-air heat exchanger 17.

Figure 2B:
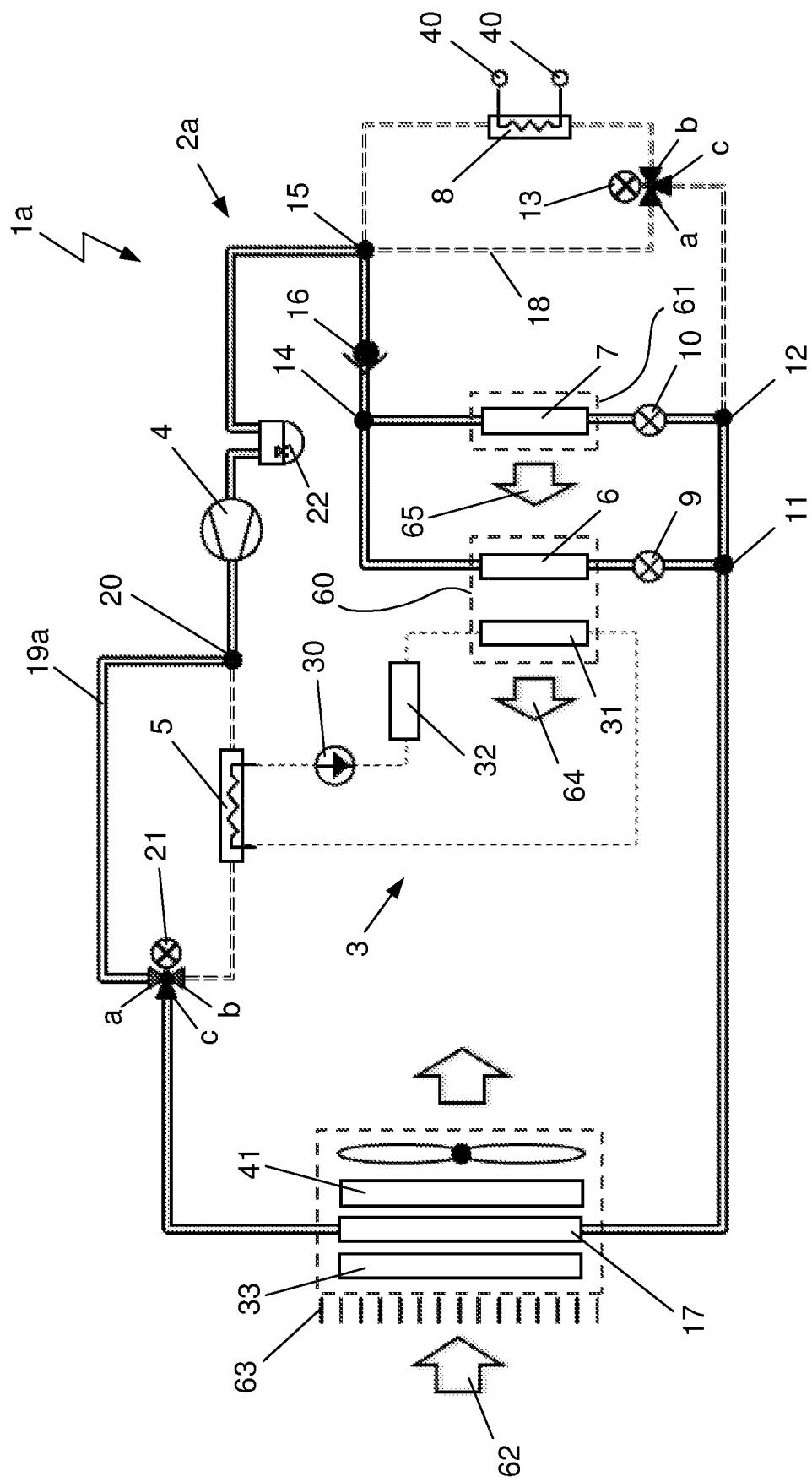
FIG. 2B: shows the system according to FIG. 1 when operating in the refrigeration system mode.
Figure 2C:
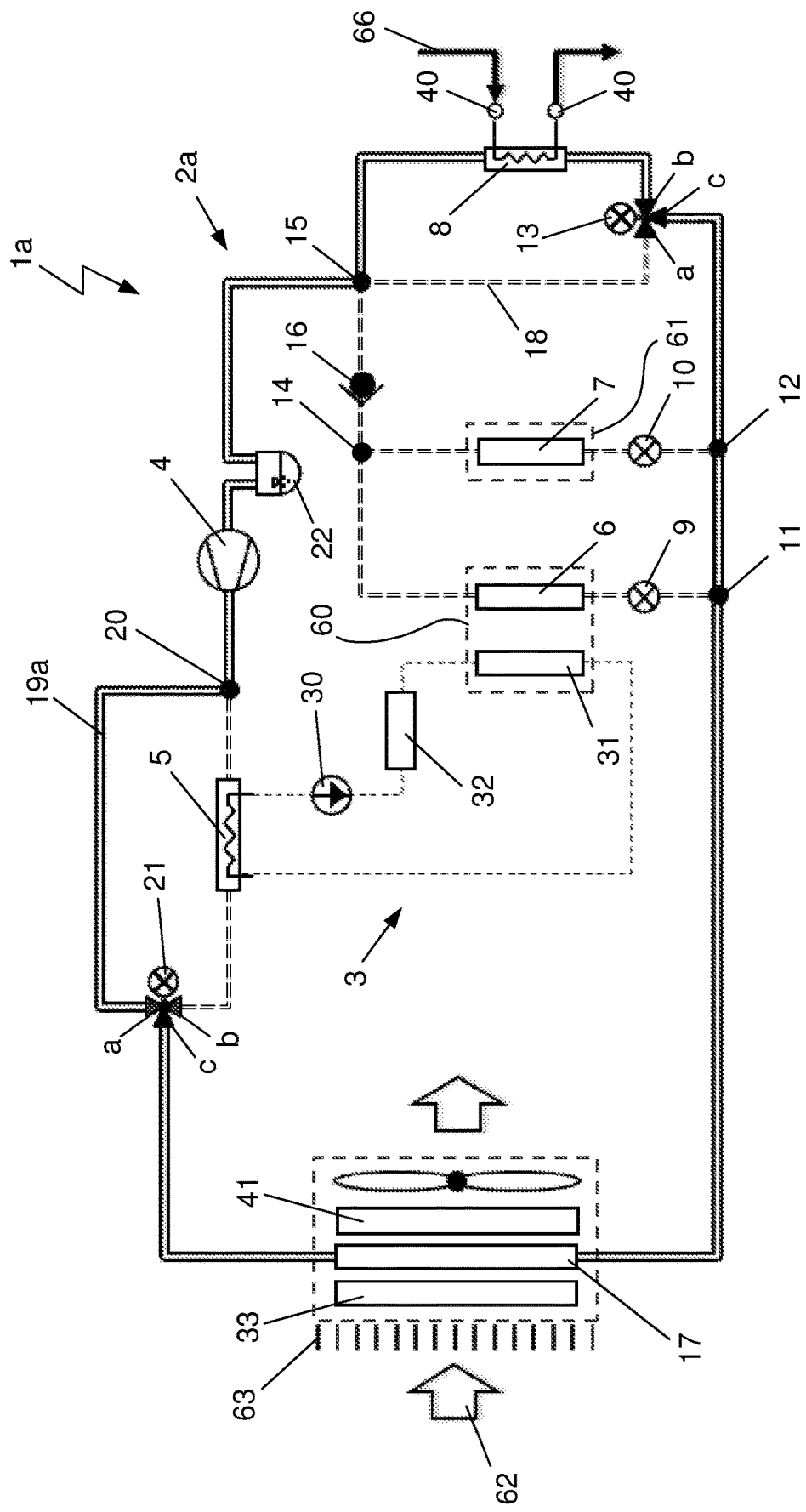
FIG. 2C: shows the system according to FIG. 1 when operating with active cooling of the drive components of the drive train, especially electric drive train.

The system 1a according to FIG. 1 emerges from FIG. 2B when operating exclusively in the refrigeration system mode for the supply air of the passenger compartment, while FIG. 2C shows the system 1a according to FIG. 1 when operating exclusively with active cooling of the drive components of the drive train, especially electric drive train.

In contrast to the operation of the system 1a according to FIG. 2A, the high-pressure refrigerant in the operation according to FIG. 2B after flowing out of the third refrigerant-air heat exchanger 17 is only divided into two partial mass flows at the first branch point 11. The refrigerant of the two partial mass flows is expanded in each case as it flows through the expansion elements 9, 10 and supplied to one of the refrigerant-air heat exchangers 6, 7 operated as evaporators. In the first three-way valve 13 formed as the third branch point 13, all three connections a, b, c are closed so that neither the second refrigerant-coolant heat exchanger 8 of the second coolant circuit nor the first bypass flow path 18 are loaded with refrigerant.

In contrast to the operation of the system 1a according to FIG. 2A, the high-pressure refrigerant in the operation according to FIG. 2C after flowing out of the third refrigerant-air heat exchanger 17 is passed completely to the third branch point 13, which is operated as the first three-way valve 13 as an expansion element in the expansion mode. When flowing through the first three-way valve 13, the refrigerant is expanded and supplied to the refrigerant-coolant heat exchanger 8 operated as an evaporator of the second coolant circuit. The first expansion element 9 and the second expansion element 10 are closed, so that in addition to the low-pressure side first bypass flow path 18, both the first flow path with the first refrigerant-air heat exchanger 6 and the second flow path with the second refrigerant-air heat exchanger 7 are closed and are not loaded with refrigerant.

In addition, the second three-way valve 21 formed as the third opening point 21, is operated in bypass mode. The second three-way valve 21 is fully open between the first connection a and the third connection c, so that the refrigerant passes the second three-way valve 21 with almost no pressure loss. The high-pressure side second bypass flow path 19a is open. The first refrigerant-coolant heat exchanger 5 of the first coolant circuit 3 is not loaded with refrigerant.

Figure 3A:
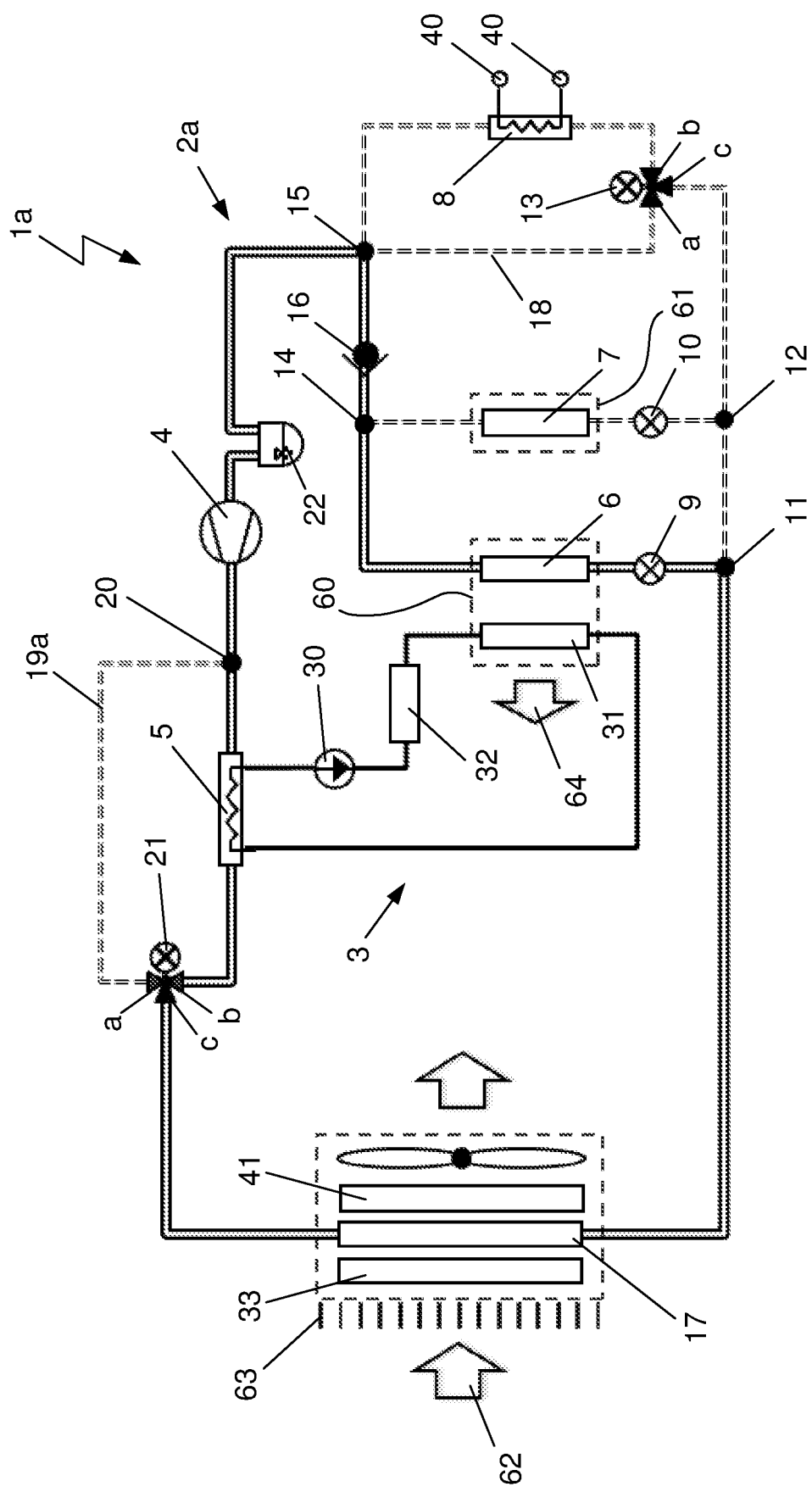
FIG. 3A: shows the system according to FIG. 1 when operating in the reheating mode with passive cooling of the drive components of the drive train, especially electric drive train, and ambient air as a heat sink or heat source for the refrigerant.
Figure 3B:
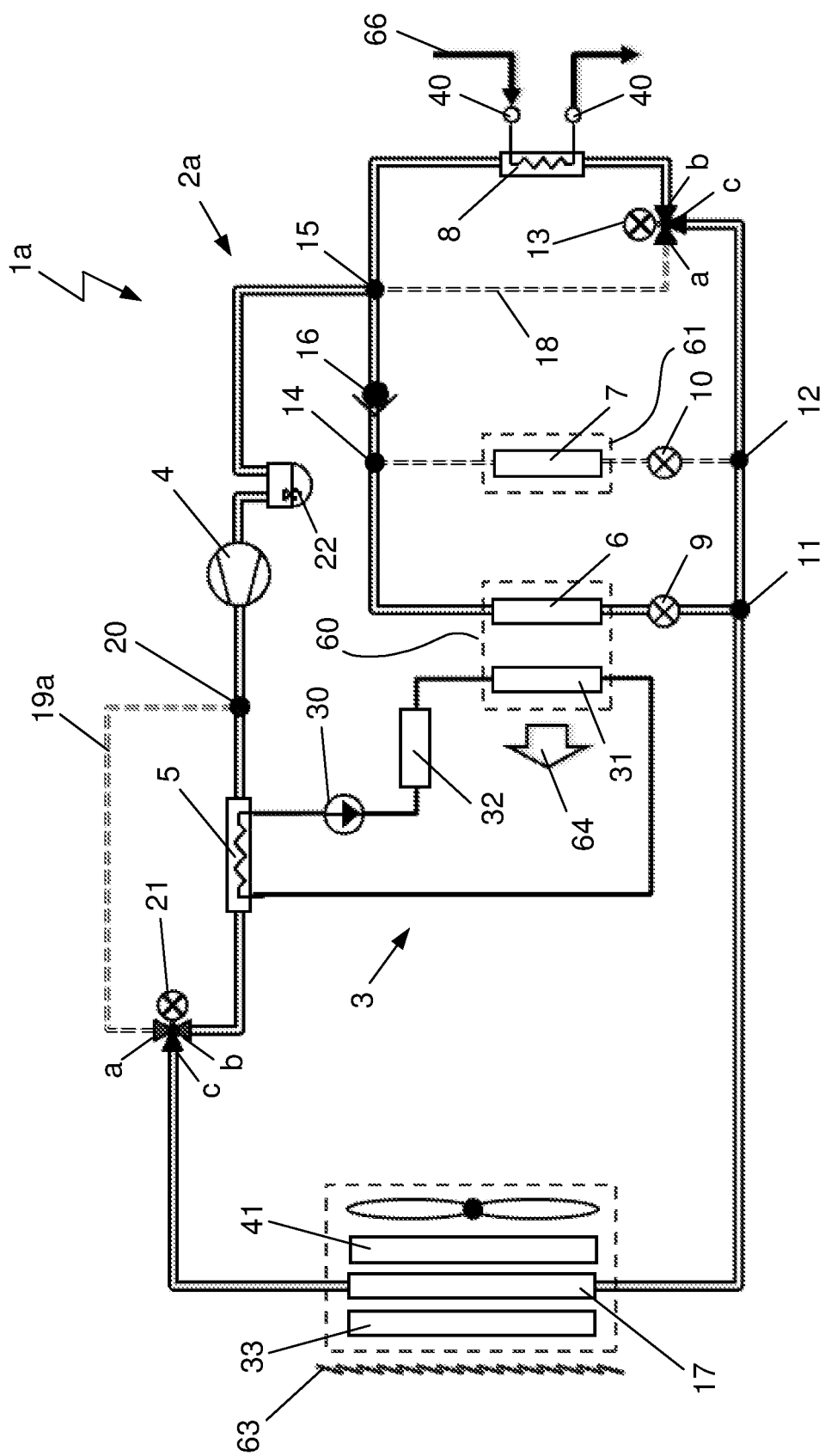
FIG. 3B: shows the system according to FIG. 1 when operating in the reheating mode with active cooling of the drive components of the drive train, especially electric drive train.
Figure 3C:
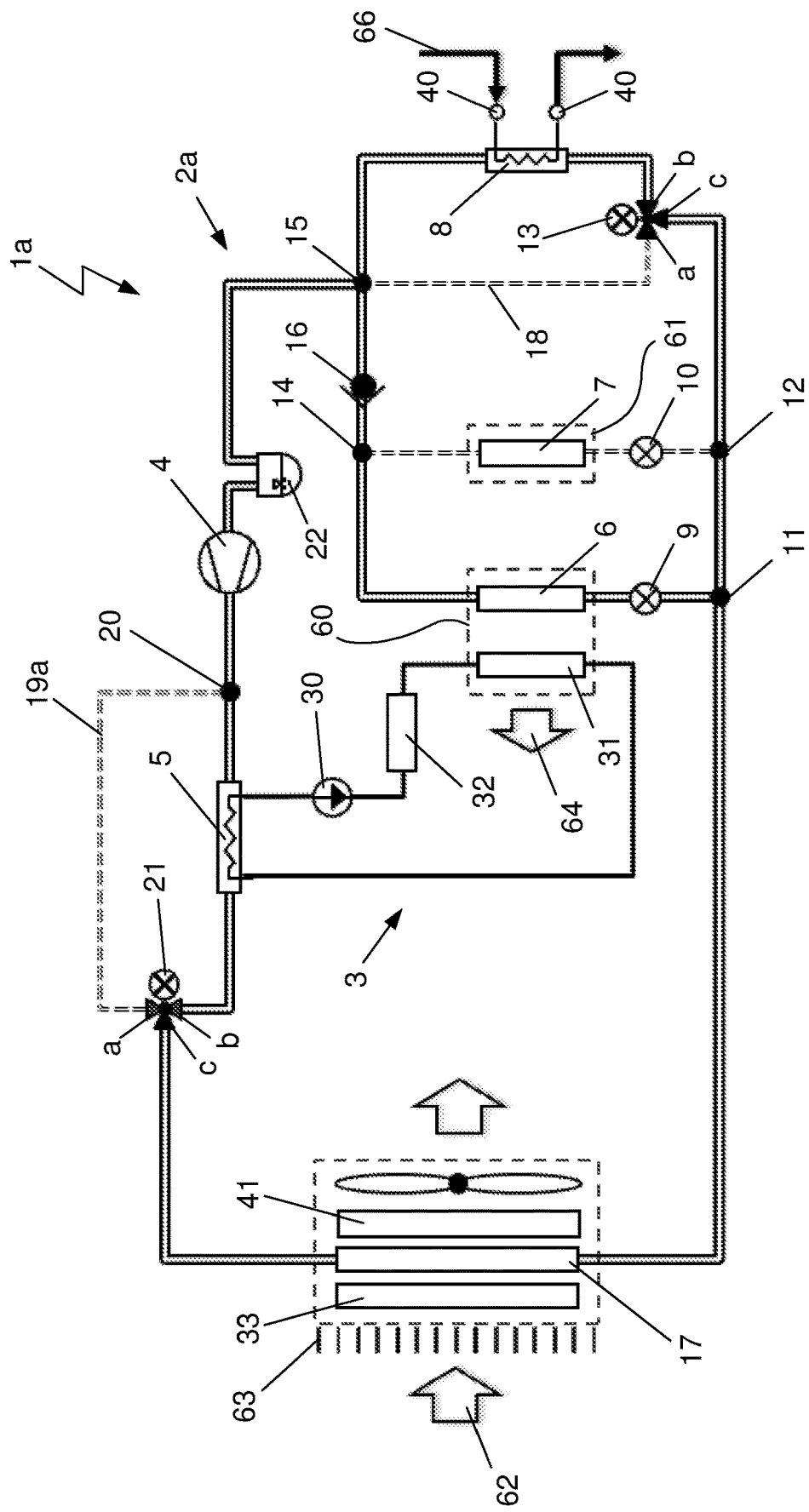
FIG. 3C: shows the system according to FIG. 1 when operating in the reheating mode with active cooling of the drive components of the electric drive train and ambient air as heat source for the refrigerant.
Figure 4A:
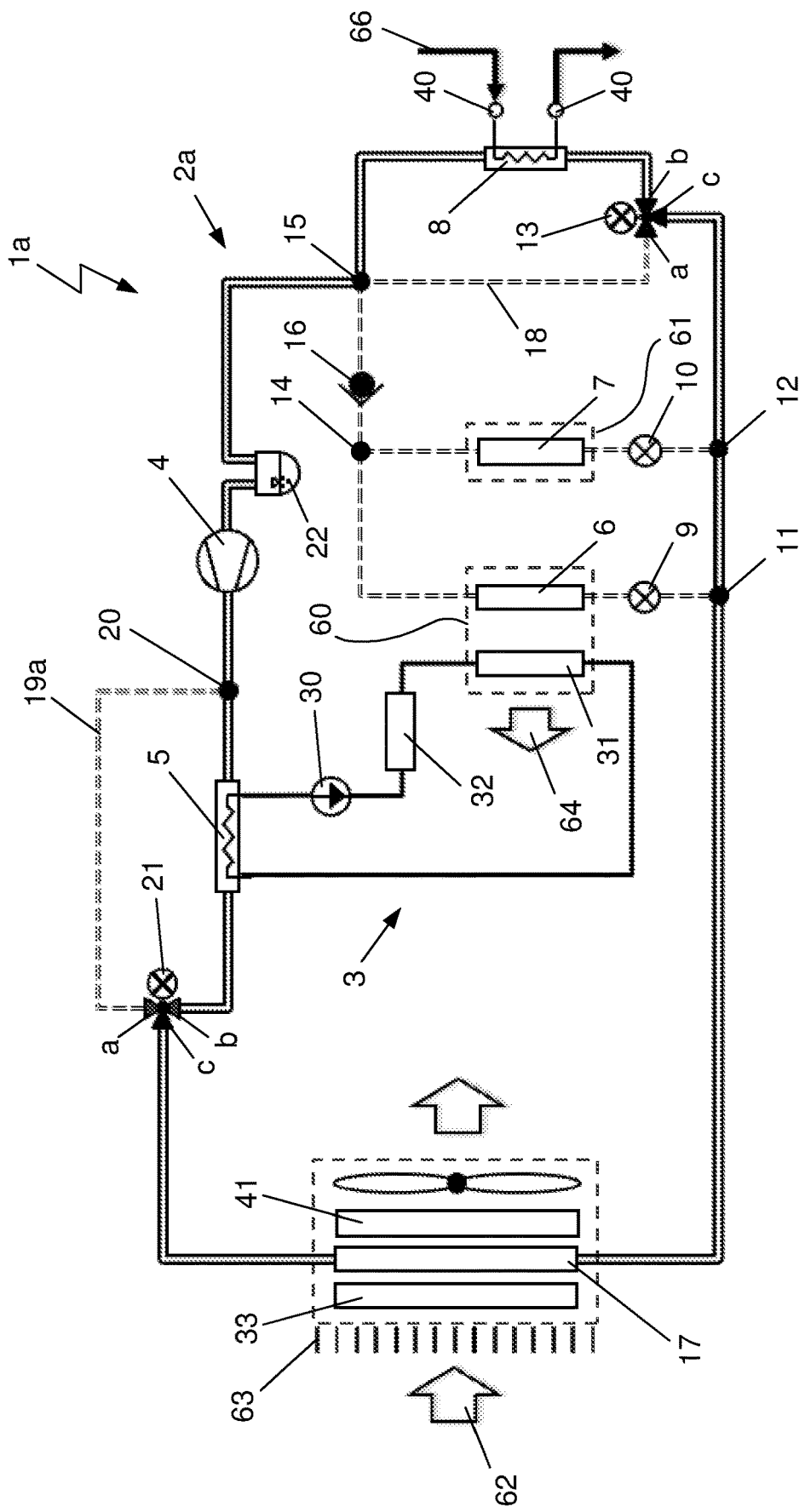
FIG. 4A: shows the system according to FIG. 1 when operating in the heating mode with active cooling of the drive components of the drive train, especially electric drive train, and ambient air as heat source for the refrigerant.
Figure 4B:
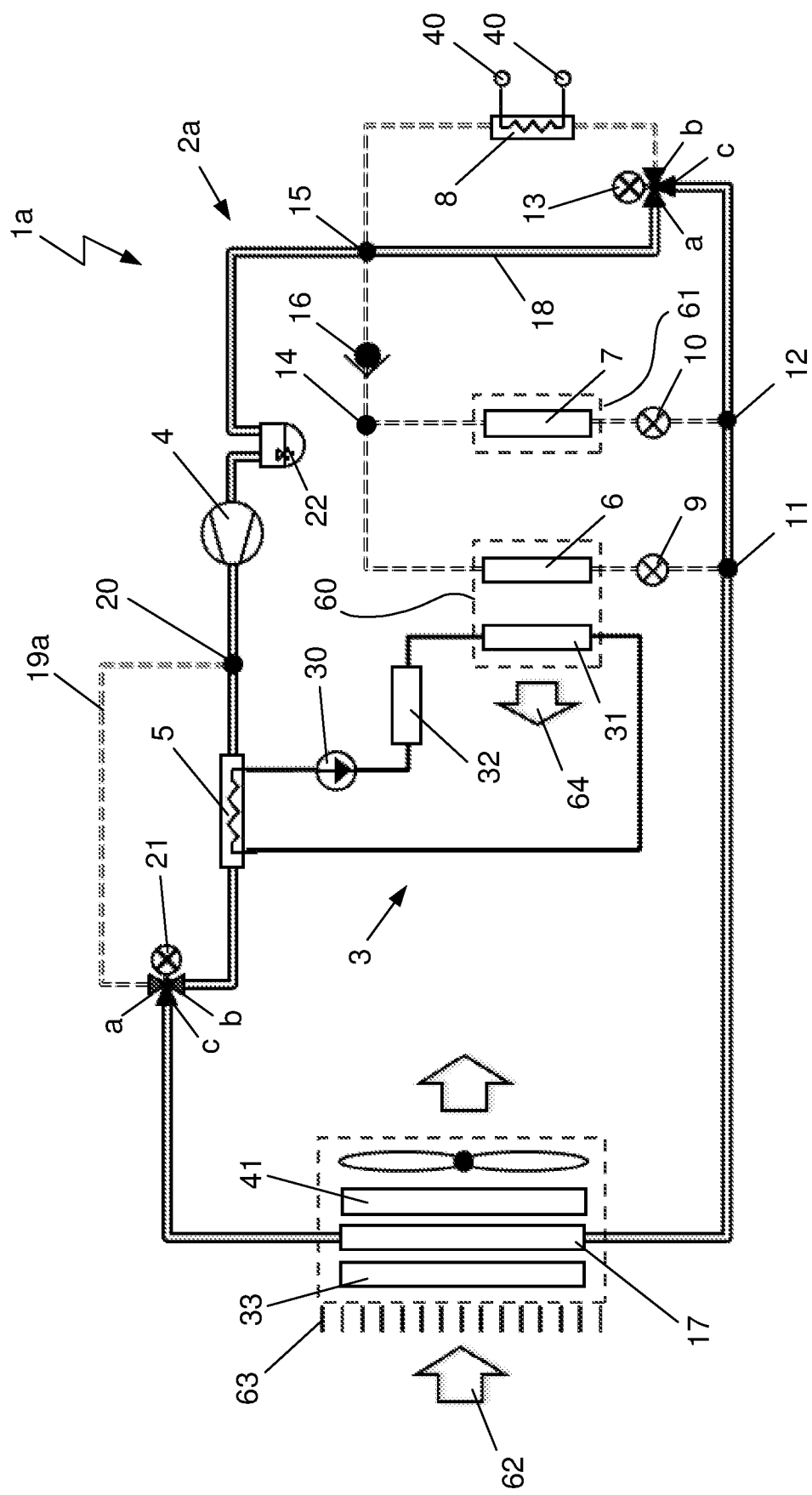
FIG. 4B: shows the system according to FIG. 1 when operating in the heating mode with ambient air as heat source for the refrigerant.
Figure 4C:
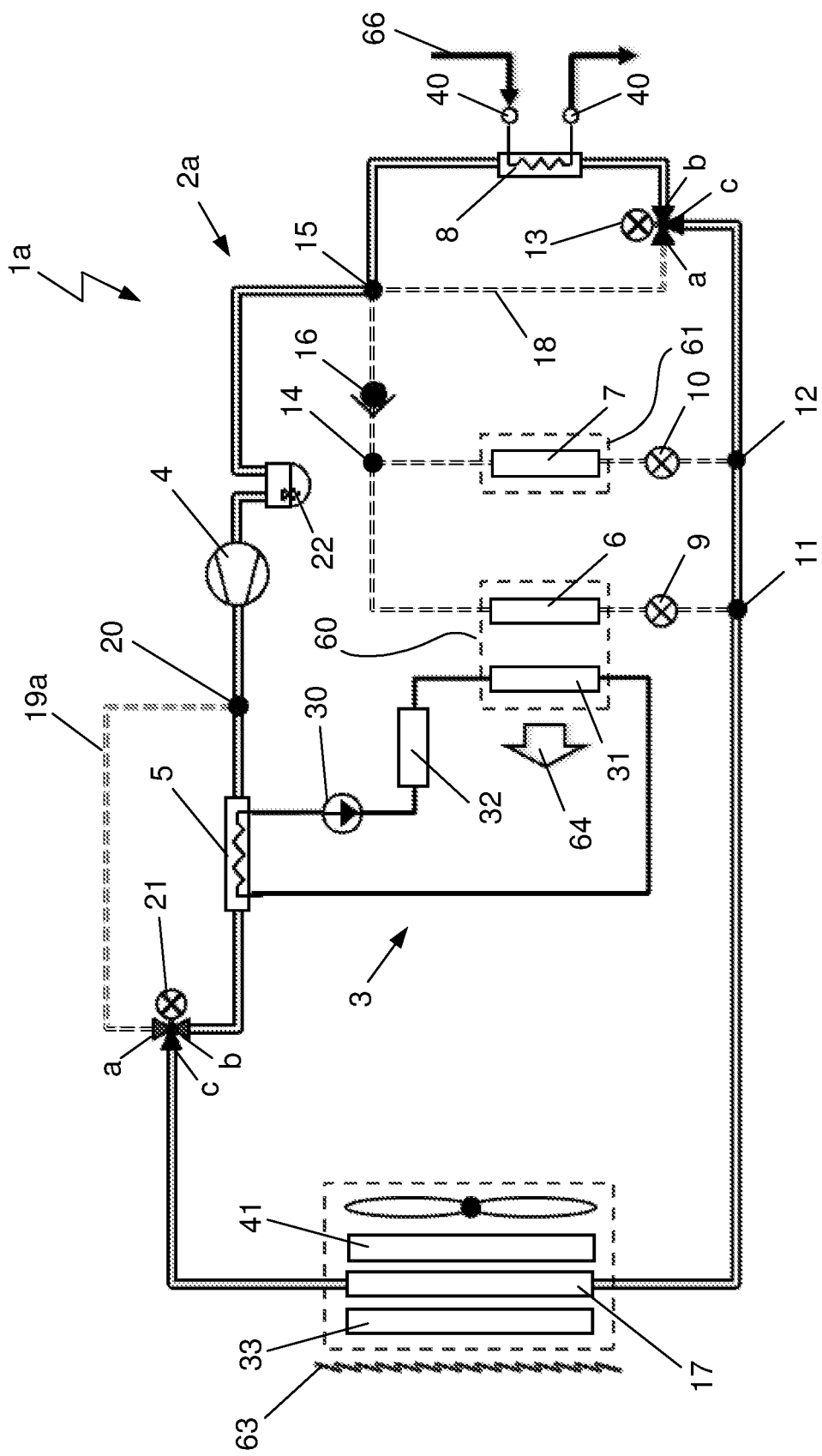
FIG. 4C: shows the system according to FIG. 1 when operating in the heating mode with active cooling of the drive components of the drive train, especially electric drive train.

FIGS. 3A to 3C in each case show the system 1a according to FIG. 1 when operating in a reheating mode, while FIG. 4A to 4C in each case show the system 1a according to FIG. 1 when operating in a heating mode.

When operating the system 1a in a heating mode or a reheating mode, both the waste heat of the air-conditioning system, especially the heat transferred from the supply air for the passenger compartment to the refrigerant circulating in the refrigerant circuit 2a in the first refrigerant-air heat exchanger 6 or in the second refrigerant-air heat exchanger 7, and the heat transferred from at least one component of the drive train, especially electric drive train, to the refrigerant circulating in the refrigerant circuit 2a in the second refrigerant-coolant heat exchanger 8, are utilized to heat the supply air for the passenger compartment.

In this case, the coolant circulating in the first coolant circuit 3, which is heated when flowing through the first refrigerant-coolant heat exchanger 5 operated as a condenser/gas cooler for the coolant, is passed through the first coolant-air operated as a thermal heat exchanger 31 to transfer heat from the coolant to the supply air for the passenger compartment.

When operating system 1a according to FIG. 1 in a reheating mode with passive cooling of the drive components of the drive train, especially electric drive train, and ambient air as a heat sink or heat source for the refrigerant according to FIG. 3A, either the heat transferred from the supply air for the passenger compartment to the refrigerant circulating in the refrigerant circuit 2a in the first refrigerant-air heat exchanger 6, is transferred proportionally from the refrigerant to the coolant circulating in the first coolant circuit 3 in the first refrigerant-coolant heat exchanger 5 as well as from the refrigerant to the ambient air in the third refrigerant-air heat exchanger 17, as needed, or additional heat is absorbed from the ambient air in the third refrigerant-air heat exchanger 17, which, together with the heat transmitted from the supply air for the passenger compartment to the refrigerant circulating in the refrigerant circuit 2a in the first refrigerant-air heat exchanger 6, is transferred from the refrigerant to the coolant circulating in the first coolant circuit 3 in the first refrigerant-coolant heat exchanger 5.

The supply air for the front area of the passenger compartment is passed in the direction of flow 64 through the first housing 60 of the air conditioner, in which the first refrigerant-air heat exchanger 6 and the first coolant-air heat exchanger 31 are arranged one after the other in the direction of flow 64 of the supply air, and when flowing over the first refrigerant-air heat exchanger 6, it is dehumidified as well as possibly cooled and then heated when flowing over the first coolant-air heat exchanger 31 of the first coolant circuit 3.

The refrigerant flowing out of the third refrigerant-air heat exchanger 17 is expanded depending on the pressure level when flowing through the first expansion element 9 or is passed through the first expansion element 9 without pressure loss and supplied to the first refrigerant-air heat exchanger 6 operated as an evaporator. The second expansion element 10 upstream of the second refrigerant-air heat exchanger 7 is always closed. Refrigerant does not flow through the second refrigerant-air heat exchanger 7. All three connections a, b, c of the first three-way valve 13 formed as the third branch point 13 are always closed, so as not to load either the second refrigerant-coolant heat exchanger 8 of the second cooling circuit or the first bypass flow path 18 with refrigerant.

The second three-way valve 21 formed as the third opening point 21 is operated in various modes as needed and thus utilizing the ambient air as a heat sink or heat source for the refrigerant. The first connection a of the second three-way valve 21 is always closed so that the second bypass flow path 19a is not loaded with refrigerant and the refrigerant for transferring the heat to the coolant of the first coolant circuit 3 flows through the first refrigerant-coolant heat exchanger 5.

On the one hand, the second three-way valve 21 between the second connection b and the third connection c can be fully open, so that the refrigerant passes the second three-way valve 21 with almost no pressure loss. The refrigerant flows out of the second three-way valve 21 through the third connection c in the direction of the third refrigerant-air heat exchanger 17 at high-pressure level. The refrigerant is then passed through the third refrigerant-air heat exchanger 17 operated as a condenser/gas cooler. In the process, heat is transferred from the refrigerant to the ambient air. When flowing through the first expansion member 9, the refrigerant is expanded from the high-pressure level to the low-pressure level.

On the other hand, the second three-way valve 21 between the second connection b and the third connection c can be set in such a way that the refrigerant is expanded when flowing through the second three-way valve 21. The refrigerant flows out of the second three-way valve 21 through the third connection c in the direction of the third refrigerant-air heat exchanger 17 at a medium-pressure level or at the low-pressure level. The refrigerant is then passed through the third refrigerant-air heat exchanger 17, which is operated either as a condenser/gas cooler or as an evaporator for the refrigerant, depending on the pressure level of the refrigerant in conjunction with the temperature of the ambient air. In this case, depending on the operating mode, heat is transferred from the refrigerant to the ambient air or from the ambient air to the refrigerant. If the refrigerant is depressurized to a low-pressure level when flowing through the second three-way valve 21, the first expansion element 9 is fully open, otherwise the refrigerant is expanded to the low-pressure level when flowing through the first expansion element 9.

The cooling air louver 63 arranged at the motor vehicle on the front side is closed or open depending on the required performance of the third refrigerant-air heat exchanger 17, the second coolant-air heat exchanger 33, or the third coolant-air heat exchanger 41 and the speed of the motor vehicle when the fan is not activated, and always open when the fan is activated, so that the ambient air flows through the cooling air louver 63 and over the heat transfer surface of the third refrigerant-air heat exchanger 17.

When operating the system 1a according to FIG. 1 in a reheating mode with active cooling of the drive components of the drive train, especially electric drive train, according to FIG. 3B, the heat transferred to the refrigerant circulating in the refrigerant circuit 2a both from the supply air for the passenger compartment in the first refrigerant-air heat exchanger 6 and from the coolant of the second coolant circuit in the second refrigerant-coolant heat exchanger 8 in each case, is transferred from the refrigerant to the coolant circulating in the first coolant circuit 3 in the first refrigerant-coolant heat exchanger 5.

The supply air for the front area of the passenger compartment is in each case passed in the direction of flow 64 through the first housing 60 of the air conditioner, in which the first refrigerant-air heat exchanger 6 and the first coolant-air heat exchanger 31 are arranged one after the other in the direction of flow 64 of the supply air, and when flowing over the first refrigerant-air heat exchanger 6, it is dehumidified as well as possibly cooled and then heated when flowing over the first coolant-air heat exchanger 31 of the first coolant circuit 3.

The coolant of the second coolant circuit is conveyed in the direction of flow 66 through the second refrigerant-coolant heat exchanger 8, which is operated as a counter-current heat exchanger.

After flowing out of the third refrigerant-air heat exchanger 17, the high-pressure refrigerant is divided into two partial mass flows at the branch point 11. The refrigerant of each of the two partial mass flows is expanded and supplied to the refrigerant-air heat exchanger 6 operated as an evaporator or the second refrigerant-coolant heat exchanger 8 operated as an evaporator. In this case, the first three-way valve 13 formed as the third branch point 13 is operated as an expansion element in the expansion mode. Both the low-pressure side first bypass flow path 18 and the second expansion element 10 upstream of the second refrigerant-air heat exchanger 7 are closed. Neither the second refrigerant-air heat exchanger 7 nor the first bypass flow path 18 are loaded with refrigerant.

The second three-way valve 21 formed as the third opening point 21 is operated in such a way so that, on the one hand, the first connection a is closed, so that the second bypass flow path 19a is not loaded with refrigerant, and the refrigerant for transferring the heat to the coolant of the first coolant circuit 3 flows through the first refrigerant-coolant heat exchanger 5, and, on the other hand, the passage between the second connection b and the third connection c is fully open, so that the refrigerant passes the second three-way valve 21 with almost no pressure loss. The refrigerant flows out of the second three-way valve 21 through the third connection c in the direction of the third refrigerant-air heat exchanger 17 at high-pressure level.

The cooling air louver 63 arranged at the motor vehicle on the front side is closed, so that no ambient air is passed through the cooling air louver 63 to the third refrigerant-air heat exchanger 17. The third refrigerant-air heat exchanger 17 is out of operation.

FIG. 3C sets out the system 1a of FIG. 1 during operation in the reheating mode with active cooling of the drive components of the drive train, especially electric drive train, and ambient air as a heat source for the refrigerant.

In contrast to the operation of the system 1a according to FIG. 3B, on the one hand the cooling air louver 63 arranged at the motor vehicle on the front side is open, so that the ambient air flows through the cooling air louver 63 and over the heat transfer surface of the third refrigerant-air heat exchanger 17. The third refrigerant-air heat exchanger 17 is operating, wherein the refrigerant absorbs additional heat from the ambient air, which heat is transferred from the refrigerant circulating in the refrigerant circuit 2a to the coolant circulating in the first coolant circuit 3 in the first refrigerant-coolant heat exchanger 5, together with the heat transferred from the supply air for the passenger compartment in the first refrigerant-air heat exchanger 6, and that transferred from the coolant of the second coolant circuit in the second refrigerant-coolant heat exchanger 8.

On the other hand, the second three-way valve 21 formed as the third opening point 21 is operated to utilize the ambient air as an additional heat source for the refrigerant. While the first connection a of the second three-way valve 21 is closed, so that the second bypass flow path 19a is not loaded with refrigerant, and the refrigerant for transferring the heat to the coolant of the first coolant circuit 3 flows through the first refrigerant-coolant heat exchanger 5, the second three-way valve 21 between the second connection b and the third connection c is set in such a way that the refrigerant is expanded when flowing through the second three-way valve 21. The refrigerant flows through the third connection c in the direction of the third refrigerant-air heat exchanger 17 operated as an evaporator at a medium-pressure level or at the low-pressure level out of the second three-way valve 21. When flowing through the third refrigerant-air heat exchanger 17, heat is transferred from the ambient air to the refrigerant. If the refrigerant is depressurized to low-pressure level when flowing through the second three-way valve 21, the first expansion element 9 and the first three-way valve 13 formed as the third branch point 13 between the third connection c and the second connection b are each fully open, otherwise, the refrigerant is expanded to the low-pressure level when flowing through the first expansion element 9 and the first three-way valve 13 operated as an expansion element in the expansion mode.

When operating the system 1a according to FIG. 1 in a heating mode with active cooling of the drive components of the drive train, especially electric drive train, and ambient air as heat source for the refrigerant according to FIG. 4A, the heat transferred both from the coolant of the second coolant circuit in the second refrigerant-coolant heat exchanger 8 as well as that transferred from the ambient air in the third refrigerant-air heat exchanger 17 in each case to the refrigerant circulating in the refrigerant circuit 2a, is transferred from the refrigerant to the coolant circulating in the first coolant circuit 3 in the first refrigerant-coolant heat exchanger 5.

The supply air for the front area of the passenger compartment is passed in the direction of flow 64 through the first housing 60 of the air conditioner, in which the first coolant-air heat exchanger 31 is arranged, and is heated when flowing over the first coolant-air heat exchanger 31 of the first coolant circuit 3.

The coolant of the second coolant circuit is conveyed in the direction of flow 66 through the second refrigerant-coolant heat exchanger 8, which is operated as a counter-current heat exchanger.

The cooling air louver 63 arranged at the motor vehicle on the front side is open, so that the ambient air flows through the cooling air louver 63 and over the heat transfer surface of the third refrigerant-air heat exchanger 17.

The essential difference to the operation of the system 1a according to FIG. 3C is that both the first expansion element 9 upstream of the first refrigerant-air heat exchanger 6 and the second expansion device 10 upstream of the second refrigerant-air heat exchanger 7 are closed so that neither the first refrigerant-air heat exchanger 6 nor the second refrigerant-air heat exchanger 7 have refrigerant flowing through them. The supply air for the passenger compartment is neither dehumidified nor cooled, but only heated.

FIG. 4B sets out the system 1a according to FIG. 1 when operating in heating mode exclusively with ambient air as heat source for the refrigerant, while FIG. 4C shows the system 1a according to FIG. 1 when operating in the heating mode exclusively with active cooling of the drive components of the drive train, especially electric drive train, and thus the drive components as heat source for the refrigerant.

In contrast to the operation of the system 1a according to FIG. 4A, on the one hand the first three-way valve 13 formed as a third branch point 13 is operated in the bypass mode when operating according to FIG. 4B. The first three-way valve 13 is fully open between the third connection c and the first connection a, so that the refrigerant passes the first three-way valve 13 with almost no pressure loss. The low-pressure side first bypass flow path 18 is open. The second refrigerant-coolant heat exchanger 8 of the second coolant circuit is not loaded with refrigerant. With the flow of the refrigerant through the first bypass flow path 18, the refrigerant can be passed from the third refrigerant-air heat exchanger 17 directly to the accumulator 22 in order to minimize suction-side pressure losses in the refrigerant circuit 2a.

On the other hand, the second three-way valve 21 formed as the third opening point 21 is always operated to utilize the ambient air as heat source for the refrigerant in such a way that the refrigerant is expanded to the low-pressure level when flowing through the second three-way valve 21.

In contrast to the operation of the system 1a according to FIG. 4A, on the one hand, the cooling air louver 63 arranged at the motor vehicle on the front side is closed when operating according to FIG. 4C, so that no ambient air is passed through the cooling air louver 63 to the third refrigerant-air heat exchanger 17. The third refrigerant-air heat exchanger 17 is out of operation.

On the other hand, the operation of three-way valves 13, 21 is tuned to one another in such a way that either the refrigerant flowing through the second three-way valve 21 from the second connection b to the third connection c is expanded from the high-pressure level to the low-pressure level and the first three-way valve 13 between the third connection c and the second connection b is fully open or the second three-way valve 21 between the second connection b and the third connection c is fully open, and the refrigerant flowing through the first three-way valve 13 from the third connection c to the second connection b is expanded from the high-pressure level to the low-pressure level. As a result, one of the three-way valves 13, 21 is operated in the expansion mode in order to expand the refrigerant from the high-pressure level to the low-pressure level, while the other three-way valve 13, 21 is fully open to pass through the refrigerant with almost no pressure loss.

Figure 5:
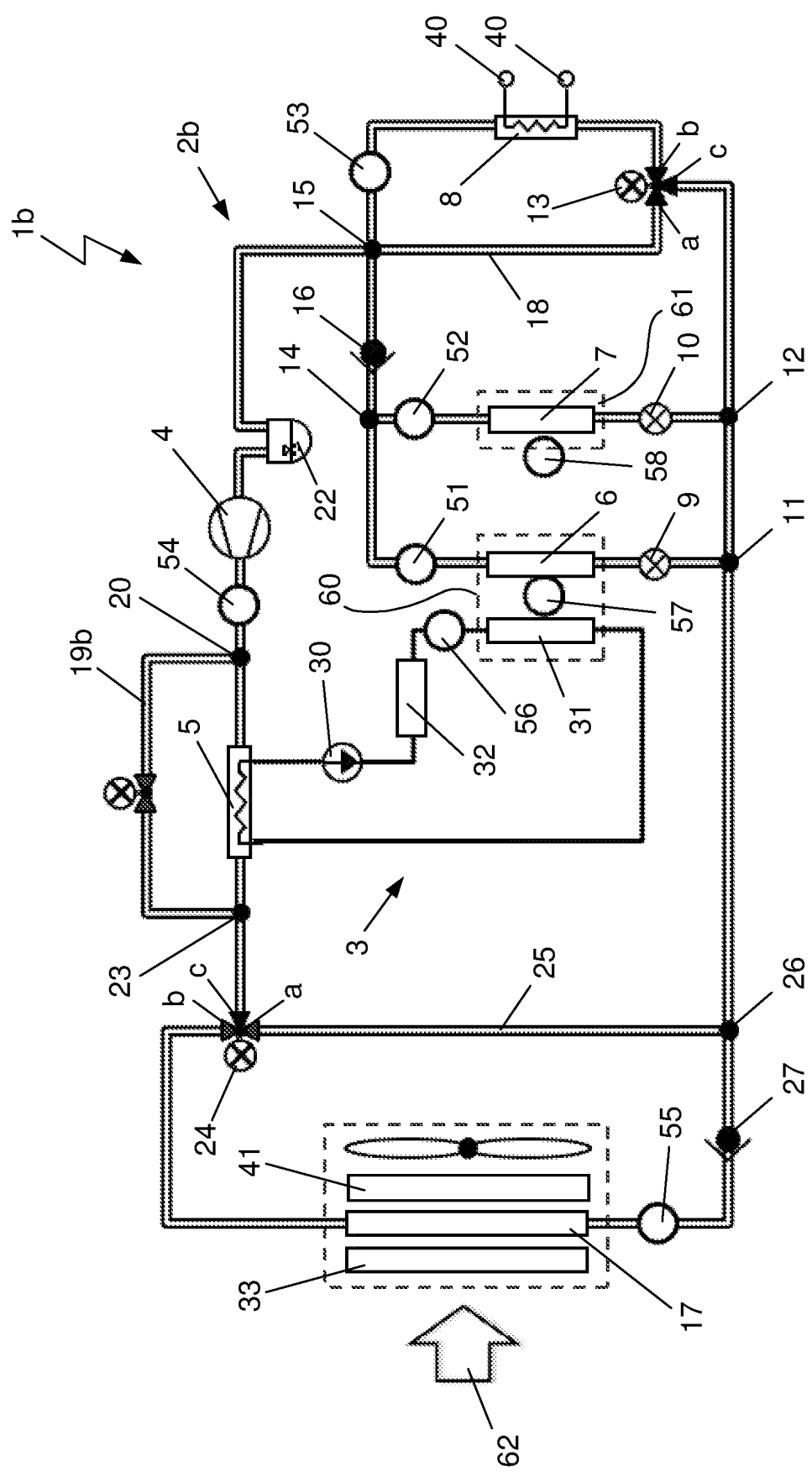
FIG. 5: shows a second system for air-conditioning the air of a passenger compartment and for heat transfer with drive components of a motor vehicle with a refrigerant circuit with a low-pressure side first bypass flow path, a high-pressure side second bypass flow path as well as a third bypass flow path for flowing around a refrigerant-air heat exchanger for transferring heat between the refrigerant and ambient air as well as with two coolant circuits each thermally coupled to the refrigerant circuit.

FIG. 5 shows a second system 1b for air-conditioning the air of a passenger compartment and for heat transfer with drive components of a motor vehicle with a refrigerant circuit 2b with the low-pressure side first bypass flow path 18, a high-pressure side second bypass flow path 19b for flowing around the first refrigerant-coolant heat exchanger 5 as well as a third bypass flow path 25 for flowing around the third refrigerant-air heat exchanger 17 for transferring heat between the refrigerant and ambient air as well as with two coolant circuits 3 each thermally coupled to the refrigerant circuit 2b.

The main difference between the first system 1a according to FIG. 1 and the second system 1b is the formation of the refrigerant circuits 2a, 2b with the second bypass flow path 19a, 19b around the first refrigerant-coolant heat exchanger 5 in conjunction with the formation of the third opening point 21, 23 as well as a third bypass flow path 25 around the third refrigerant-air heat exchanger 17.

The second bypass flow path 19b of the refrigerant circuit 2b arranged on the high-pressure side, extends from the fourth branch point 20 to the third opening point 23. In this case, the fourth branch point 20 is, as in the refrigerant circuit 2a of the system 1a, formed between the compressor 4 and the first refrigerant-coolant heat exchanger 5, while the third opening point 23 is provided between the first refrigerant-coolant heat exchanger 5 and the additional fifth branch point 24. The second bypass flow path 19b has a shut-off element, especially a shut-off valve, within the refrigerant connection line.

At the fourth branch point 20, the refrigerant can in turn be passed either through the first refrigerant-coolant heat exchanger 5 or through the second bypass flow path 19b.

The fifth branch point 24, like the third opening point 21 of the refrigerant circuit 2a of the 5 system 1a, is formed as a second three-way valve with expansion function and three connections a, b, c. In this case, the second three-way valve 24 of the refrigerant circuit 2b of the system 1b is connected to the third bypass flow path 25 via the first connection a, which third bypass flow path 25 extends from the three-way valve 24 to a fourth opening point 26. The fourth opening point 26 is provided between the third refrigerant-air heat 10 exchanger 17 and the first branch point 11. The second three-way valve 24 is also coupled to the third refrigerant-air heat exchanger 17 via the second connection b, while a connection to the third opening point 23 is established via the third connection c.

To prevent the refrigerant passed through the third bypass flow path 25 from flowing back to the third refrigerant-air heat exchanger 17, a second non-return device 27, especially a check valve, is provided between the fourth opening point 26 and the third refrigerant-air heat exchanger 17. The first non-return device 16, especially formed as a check valve, is arranged between the first opening point 14 and the second opening point 15, as in the case of the refrigerant circuit 2a of the system 1a of FIG. 1.

The second three-way valve 24 of the refrigerant circuit 2b of the system 1b can also be operated in different functional principles, especially as a shut-off valve and an expansion valve. The functions of a shut-off valve and an expansion valve are combined within one component.

In one of the functional principles, the first connection a and thus the third bypass flow path 25 is closed, while the second connection b and the third connection c are open. The second three-way valve 24 of the refrigerant circuit 2b of the system 1b can, on the one hand, be set in such a way that the refrigerant is expanded as it flows through, or the second three-way valve 24 is fully open so that the refrigerant is passed through with almost no pressure loss. When operating the second three-way valve 24 of the refrigerant circuit 2b of the system 1b in this way, the refrigerant flows in through the third connection c and flows out, expanded or without pressure loss, through the second connection b in the direction of the third refrigerant-air heat exchanger 17. With the second three-way valve 24 of the refrigerant circuit 2b of the system 1b, which is especially formed as an electronic component, any pressure between the high-pressure level and the low-pressure level of the refrigerant circuit 2b can be set. With the setting of the medium-pressure level, the third refrigerant-air heat exchanger 17 can be operated as an ambient air heat exchanger either as condenser/gas cooler to release heat to the ambient air or as evaporator to absorb heat from the ambient air.

Another functional principle enables the refrigerant to be passed through the third bypass flow path 25 without any pressure loss of the refrigerant. In this case, the second connection b is closed, while both the first connection a and the third connection c are fully open. The second three-way valve 24 of the refrigerant circuit 2b of the system 1b is operated in bypass mode.

Regarding the individual operating modes of the second system 1b, especially refrigerant circuit 2b, reference is made to the statements relating to FIGS. 2A to 2C, 3A to 3C and 4A to 4C with regard to the first system 1a.

When operating the second system 1b according to FIG. 5 in a refrigeration system mode with or without or exclusively with active cooling of drive components of the drive train, especially electric drive train, the second three-way valve 24 formed as a fifth branch point 24 is operated in each case in such a way that the passage between the third connection c and the second connection b is fully open, so that the refrigerant passes the second three-way valve 24 in the direction of the third refrigerant-air heat exchanger 17 with almost no pressure loss. The high-pressure side second bypass flow path 19b is open. The first refrigerant-coolant heat exchanger 5 of the first coolant circuit 3 in each case is not loaded with refrigerant.

When operating the second system 1b according to FIG. 5 in a reheating mode or a heating mode, the high-pressure-side second bypass flow path 19b is always closed, so that the refrigerant is passed through the first refrigerant-coolant heat exchanger 5 of the first coolant circuit 3.

When operating the second system 1b according to FIG. 5 in the reheating mode with active cooling of the drive components of the drive train, especially electric drive train, as well as in the heating mode exclusively with active cooling of the drive components of the drive train, especially electric drive train, the second three-way valve 24 is operated in bypass mode. The second three-way valve 24 is fully open between the third connection c and the first connection a, so that the refrigerant passes the second three-way valve 24 with almost no pressure loss. The third bypass flow path 25 is always open, so that the refrigerant is passed through the third bypass flow path 25 and thus around the third refrigerant-air heat exchanger 17. The third refrigerant-air heat exchanger 17 is not loaded with refrigerant. With the flow of the refrigerant through the third bypass flow path 25, the refrigerant can be passed from the first refrigerant-coolant heat exchanger 5 directly to the first branch point 11 in order to minimize pressure losses in the refrigerant circuit 2b.

LIST OF REFERENCE NUMERALS 1a, 1b system
2a, 2b refrigerant circuit
3 first coolant circuit
4 compressor
5 first refrigerant-coolant heat exchanger
6 first refrigerant-air heat exchanger
7 second refrigerant-air heat exchanger
8 second refrigerant-coolant heat exchanger
9 first expansion element
10 second expansion element
11 first branch point
12 second branch point
13 third branch point, third expansion element, first three-way valve
14 first opening point
15 second opening point
16 (first) non-return device
17 third refrigerant-air heat exchanger
118 first bypass flow path
19a, 19b second bypass flow path
20 fourth branch point
21 third opening point, second three-way valve
22 accumulator
23 third opening point
24 fifth branch point, second three-way valve
25 third bypass flow path
26 fourth opening point
27 second non-return device
30 conveyor of the first coolant circuit 3
31 first coolant-air heat exchanger
32 auxiliary thermal heat exchanger
33 second coolant-air heat exchanger
40 connection of the second coolant circuit
41 third coolant-air heat exchanger
51 first sensor, first temperature sensor, refrigerant
52 second sensor, second temperature sensor, refrigerant
53 third sensor, first pressure-temperature sensor, refrigerant
54 fourth sensor, second pressure-temperature sensor, refrigerant
55 fifth sensor, third pressure-temperature sensor, refrigerant
56 sixth sensor, third temperature sensor, coolant
57 seventh sensor, fourth temperature sensor, supply air
58 eighth sensor, fifth temperature sensor, supply air
60 first housing of air conditioner
61 second housing of air conditioner
62 direction of flow of ambient air
63 flow guide of ambient air, cooling air louver
64 direction of flow of supply air, first housing 60
65 direction of flow of supply air, second housing 61
66 direction of flow of coolant
a, b, c connection, three-way valve 13, 21, 24.

What is claimed is:
1. A system for air-conditioning air of a passenger compartment and for heat transfer with drive components of a motor vehicle, comprising:

a refrigerant circuit with a compressor, a first refrigerant-coolant heat exchanger operated as a condenser/gas cooler, a first refrigerant-air heat exchanger operated as an evaporator for conditioning supply air of the passenger compartment with a first upstream expansion element, and a second refrigerant-coolant heat exchanger operated as an evaporator for heat transfer between a coolant for tempering the drive components of the motor vehicle and a refrigerant with a second upstream expansion element; and a first coolant circuit with the first refrigerant-coolant heat exchanger and a first coolant-air heat exchanger operated as a thermal heat exchanger for heating the supply air of the passenger compartment, wherein the refrigerant circuit is formed on a low-pressure side with a first bypass flow path around the first refrigerant-air heat exchanger operated as the evaporator and the second refrigerant-coolant heat exchanger operated as the evaporator, wherein the refrigerant circuit is formed with a second refrigerant-air heat exchanger for heat transfer between the refrigerant and ambient air, which, in a direction of flow of the refrigerant, is arranged after the first refrigerant-coolant heat exchanger, and wherein the second refrigerant-air heat exchanger is arranged for heat transfer between the refrigerant and the ambient air within an air duct for targeted passing of the ambient air, which is closable by means of a flow guide.

2. The system according to claim 1, wherein the refrigerant circuit is formed in such a way that the first refrigerant-air heat exchanger for conditioning the supply air of the passenger compartment with the first upstream expansion element and the second refrigerant-coolant heat exchanger with the second upstream expansion element as well as the first bypass flow path can each be loaded with the refrigerant in parallel to one another and independently of one another.

3. The system according to claim 1, wherein the flow guide is formed to be actively controllable and adjustable.

4. A system for air-conditioning air of a passenger compartment and for heat transfer with drive components of a motor vehicle, comprising:

a refrigerant circuit with a compressor, a first refrigerant-coolant heat exchanger operated as a condenser/gas cooler, a first refrigerant-air heat exchanger operated as an evaporator for conditioning supply air of the passenger compartment with a first upstream expansion element, and a second refrigerant-coolant heat exchanger operated as an evaporator for heat transfer between a coolant for tempering the drive components of the motor vehicle and a refrigerant with a second upstream expansion element; and a first coolant circuit with the first refrigerant-coolant heat exchanger and a first coolant-air heat exchanger operated as a thermal heat exchanger for heating the supply air of the passenger compartment, wherein the refrigerant circuit is formed on a low-pressure side with a first bypass flow path around the first refrigerant-air heat exchanger operated as the evaporator and the second refrigerant-coolant heat exchanger operated as the evaporator, wherein a high-pressure side of the refrigerant circuit is formed with a second bypass flow path around the first refrigerant-coolant heat exchanger operated as the condenser/gas cooler, which extends from a branch point to an opening point.

5. The system according to claim 4, wherein the opening point is formed as a three-way valve with expansion function and having three connections.

6. The system according to claim 5, wherein the three-way valve is connected at a first one of the connections with the second bypass flow path around the first refrigerant-coolant heat exchanger, at a second one of the connections with the first refrigerant-coolant heat exchanger and at a third one of the connections with a second refrigerant-air heat exchanger for heat transfer between the refrigerant and ambient air.

7. A system for air-conditioning air of a passenger compartment and for heat transfer with drive components of a motor vehicle, comprising:

a refrigerant circuit with a compressor, a first refrigerant-coolant heat exchanger operated as a condenser/gas cooler, a first refrigerant-air heat exchanger operated as an evaporator for conditioning supply air of the passenger compartment with a first upstream expansion element, and a second refrigerant-coolant heat exchanger operated as an evaporator for heat transfer between a coolant for tempering the drive components of the motor vehicle and a refrigerant with a second upstream expansion element; and a first coolant circuit with the first refrigerant-coolant heat exchanger and a first coolant-air heat exchanger operated as a thermal heat exchanger for heating the supply air of the passenger compartment, wherein the refrigerant circuit is formed on a low-pressure side with a first bypass flow path around the first refrigerant-air heat exchanger operated as the evaporator and the second refrigerant-coolant heat exchanger operated as the evaporator, wherein the refrigerant circuit is formed with a second refrigerant-air heat exchanger for heat transfer between the refrigerant and ambient air, which, in a direction of flow of the refrigerant, is arranged after the first refrigerant-coolant heat exchanger, wherein the refrigerant circuit is formed with a second bypass flow path around the second refrigerant-air heat exchanger for heat transfer between the refrigerant and the ambient air, which extends from a branch point to an opening point, wherein the branch point is arranged between the first refrigerant-coolant heat exchanger and the second refrigerant-air heat exchanger for heat transfer between the refrigerant and the ambient air as well as formed as a three-way valve with expansion function and with three connections.

8. The system according to claim 7, wherein the three-way valve is connected at a first one of the connections with the second bypass flow path around the second refrigerant-air heat exchanger for heat transfer between the refrigerant and the ambient air, at a second one of the connections with the second refrigerant-air heat exchanger for heat transfer between the refrigerant and the ambient air, and at a third one of the connections with the first refrigerant-coolant heat exchanger operated as the condenser/gas cooler.

9. A system for air-conditioning air of a passenger compartment and for heat transfer with drive components of a motor vehicle, comprising:

a refrigerant circuit with a compressor, a first refrigerant-coolant heat exchanger operated as a condenser/gas cooler, a first refrigerant-air heat exchanger operated as an evaporator for conditioning supply air of the passenger compartment with a first upstream expansion element, and a second refrigerant-coolant heat exchanger operated as an evaporator for heat transfer between a coolant for tempering the drive components of the motor vehicle and a refrigerant with a second upstream expansion element; and a first coolant circuit with the first refrigerant-coolant heat exchanger and a first coolant-air heat exchanger operated as a thermal heat exchanger for heating the supply air of the passenger compartment, wherein the refrigerant circuit is formed on a low-pressure side with a first bypass flow path around the first refrigerant-air heat exchanger operated as the evaporator and the second refrigerant-coolant heat exchanger operated as the evaporator, wherein the first bypass flow path formed on the low-pressure side around the first refrigerant-air heat exchanger operated as the evaporator and the second refrigerant-coolant heat exchanger operated as the evaporator and a first flow path formed with the second refrigerant-coolant heat exchanger operated as the evaporator are each formed extending from a first branch point to an opening point, wherein the first branch point is formed as a three-way valve with expansion function and with three connections.

10. The system according to claim 9, wherein the three-way valve is connected at a first one of the connections with the first bypass flow path around the first refrigerant-air heat exchanger operated as the evaporator and the second refrigerant-coolant heat exchanger operated as the evaporator, at a second one of the connections with the first flow path with the second refrigerant-coolant heat exchanger operated as the evaporator, and at a third one of the connections with a second branch point to a second flow path with the first refrigerant-air heat exchanger operated as the evaporator for conditioning the supply air of the passenger compartment.

11. The system according to claim 5, wherein the first one of the connections and a second one of the connections each are formed as an outlet and a third one of the connections as an inlet of the three-way valve.

12. The system according to claim 9, wherein the three-way valve is configured in such a way that the connections are all closed in an operating position.

13. The system according to claim 11, wherein the three-way valve is configured in such a way that in an operating position the first one of the connections is closed and the second one of the connections and the third one of the connections are open or, in an operating position, the second one of the connections is closed and the first one of the connections and the third one of the connections are open.

14. The system according to claim 13, wherein the three-way valve is configured in such a way that in the operating position with the first one of the connections closed and the second one of the connections open as well as the third one of the connections open, a passage between the open connections is partially or fully open, so that the refrigerant expands when flowing through the three-way valve or is passed through the three-way valve without pressure loss.

15. A system for air-conditioning air of a passenger compartment and for heat transfer with drive components of a motor vehicle, comprising:
a refrigerant circuit with a compressor, a first refrigerant-coolant heat exchanger operated as a condenser/gas cooler, a first refrigerant-air heat exchanger operated as an evaporator for conditioning supply air of the passenger compartment with a first upstream expansion element, and a second refrigerant-coolant heat exchanger operated as an evaporator for heat transfer between a coolant for tempering the drive components of the motor vehicle and a refrigerant with a second upstream expansion element; and
a first coolant circuit with the first refrigerant-coolant heat exchanger and a first coolant-air heat exchanger operated as a thermal heat exchanger for heating the supply air of the passenger compartment, wherein the refrigerant circuit is formed on a low-pressure side with a first bypass flow path around the first refrigerant-air heat exchanger operated as the evaporator and the second refrigerant-coolant heat exchanger operated as the evaporator, wherein the first coolant circuit is formed with the first coolant-air heat exchanger operated as the thermal heat exchanger for heating the supply air of the passenger compartment and a second coolant-air heat exchanger for heat transfer from the coolant to ambient air.

16. The system according to claim 15, wherein the first coolant circuit has a first flow path and a second flow path, each of the first flow path and the second flow path is formed extending from a branch point to an opening point and arranged to be loaded with the coolant in parallel to one another and independently of one another, wherein the first coolant-air heat exchanger operated as the thermal heat exchanger is arranged within the first flow path and the second coolant-air heat exchanger for heat transfer from the coolant to the ambient air is arranged within the second flow path.

17. The system according to claim 1, wherein the second refrigerant-coolant heat exchanger is formed as a component of a second coolant circuit.

18. A system for air-conditioning air of a passenger compartment and for heat transfer with drive components of a motor vehicle, comprising:
a refrigerant circuit with a compressor, a first refrigerant-coolant heat exchanger operated as a condenser/gas cooler, a first refrigerant-air heat exchanger operated as an evaporator for conditioning supply air of the passenger compartment with a first upstream expansion element, and a second refrigerant-coolant heat exchanger operated as an evaporator for heat transfer between a coolant for tempering the drive components of the motor vehicle and a refrigerant with a second upstream expansion element; and
a first coolant circuit with the first refrigerant-coolant heat exchanger and a first coolant-air heat exchanger operated as a thermal heat exchanger for heating the supply air of the passenger compartment, wherein the refrigerant circuit is formed on a low-pressure side with a first bypass flow path around the first refrigerant-air heat exchanger operated as the evaporator and the second refrigerant-coolant heat exchanger operated as the evaporator, wherein the second refrigerant-coolant heat exchanger is formed as a component of a second coolant circuit, and wherein the second coolant circuit is formed with a second coolant-air heat exchanger for heat transfer from the coolant to ambient air.

19. The system according to claim 1, wherein a second coolant-air heat exchanger for heat transfer from the coolant of the first coolant circuit to the ambient air and/or a third coolant-air heat exchanger for heat transfer from the coolant of a second coolant circuit to the ambient air is arranged with the second refrigerant-air heat exchanger for heat transfer between the refrigerant of the refrigerant circuit and the ambient air within the air duct, which is closable by means of the flow guide, for the targeted passing of the ambient air.

20. A method of operating the system for air-conditioning the air of the passenger compartment and for heat transfer with the drive components of the motor vehicle according to claim 1, the method comprising steps of:
transferring heat from the supply air for the passenger compartment to the refrigerant circulating in the refrigerant circuit when flowing through the first refrigerant-air heat exchanger operated as the evaporator, and/or transferring heat from the coolant to the refrigerant circulating in the refrigerant circuit when flowing through the second refrigerant-coolant heat exchanger operated as the evaporator and tempering at least one of the drive components, as well as transferring heat from the refrigerant circulating in the refrigerant circuit to the coolant circulating in the first coolant circuit when flowing through the first refrigerant-coolant heat exchanger, wherein the refrigerant is de-heated and at least partially liquefied and the coolant of the first coolant circuit is heated.

21. The method according to claim 20, wherein when operating the system in a reheating mode or a heating mode, wherein a flow guide of an air duct for targeted passing of ambient air, in which a second refrigerant-air heat exchanger for heat transfer between the refrigerant of the refrigerant circuit and the ambient air and/or a second coolant-air heat exchanger for heat transfer from the coolant of the first coolant circuit to the ambient air and/or a third coolant-air heat exchanger for heat transfer from the coolant of a second coolant circuit to the ambient air are arranged, is closed so that the air duct is not loaded with the ambient air and no heat is transferred between the refrigerant of the refrigerant circuit and the ambient air and/or no heat is transferred from the coolant to the ambient air.

22. The method according to claim 21, wherein the flow guide is actively controlled depending on an operating mode of the system and as needed.

23. The method according to claim 20, wherein when operating the system in a heating mode with ambient air as the heat source, wherein a first three-way valve with three connections and the first three-way valve formed as a first branch point is operated in a bypass mode in such a way that the refrigerant is passed through the first bypass flow path around the first refrigerant-air heat exchanger operated as the evaporator and the second refrigerant-coolant heat exchanger operated as the evaporator in other operating modes and neither of the first refrigerant-air heat exchanger operated as the evaporator and the second refrigerant-coolant heat exchanger operated as the evaporator is loaded with the refrigerant, wherein the first three-way valve is fully opened between a first one of the connections, which is connected with a second branch point to a first flow path with the first refrigerant-air heat exchanger operated the evaporator when operating in other operating modes, and a second one of the connections, which is connected to the first bypass flow path, and a third one of the connections, which is connected to a second flow path with the second refrigerant-coolant heat exchanger operated as the evaporator when operating in other operating modes, is closed.

24. The method according to claim 23, wherein a second three-way valve with three connections and the second three-way valve formed as an opening point or a third branch point is operated for using the ambient air as a heat source for the refrigerant in such a way that the refrigerant is expanded from a high-pressure level to a low-pressure level when flowing through the second three-way valve, wherein the second three-way valve between a first one of the connections and a second one of the connections is open for expanding passage through of the refrigerant, and a third one of the connections is closed.

* * * * *